(12) United States Patent
McClure et al.

(10) Patent No.: US 10,435,176 B2
(45) Date of Patent: Oct. 8, 2019

(54) PERIMETER STRUCTURE FOR UNMANNED AERIAL VEHICLE

(71) Applicant: Skydio, Inc., Redwood City, CA (US)

(72) Inventors: Stephen R. McClure, Belmont, CA (US); Benjamin S. Thompson, San Carlos, CA (US); Adam Bry, Menlo Park, CA (US); Abraham Bachrach, San Francisco, CA (US); Matthew Donahoe, Redwood City, CA (US)

(73) Assignee: SKYDIO, INC., Redwood City, CA (US)

( * ) Notice: Subject to any disclaimer, the term of this patent is extended or adjusted under 35 U.S.C. 154(b) by 403 days.

(21) Appl. No.: 15/164,679

(22) Filed: May 25, 2016

(65) Prior Publication Data

US 2017/0341776 A1  Nov. 30, 2017

(51) Int. Cl.
| | | |
|---|---|---|
| *B64D 47/08* | (2006.01) | |
| *B64C 27/20* | (2006.01) | |
| *G01C 21/20* | (2006.01) | |
| *B64C 39/02* | (2006.01) | |
| *G01C 21/16* | (2006.01) | |
| *G05D 1/10* | (2006.01) | |

(52) U.S. Cl.
CPC .............. *B64D 47/08* (2013.01); *B64C 27/20* (2013.01); *B64C 39/024* (2013.01); *G01C 21/165* (2013.01); *G01C 21/20* (2013.01); *G05D 1/102* (2013.01); *B64C 2201/027* (2013.01); *B64C 2201/108* (2013.01); *B64C 2201/127* (2013.01); *B64C 2201/141* (2013.01)

(58) Field of Classification Search
CPC .... B64C 27/20; B64C 2201/027; B64D 47/08
See application file for complete search history.

(56) References Cited

U.S. PATENT DOCUMENTS

| 7,773,116 | B1 * | 8/2010 | Stevens | ..................... F41G 3/02 |
|---|---|---|---|---|
| | | | | 348/144 |
| 8,043,513 | B2 | 10/2011 | Milanovic et al. | |
| 8,712,679 | B1 | 4/2014 | Mostofi et al. | |
| 9,243,916 | B2 * | 1/2016 | Roumeliotis | ........ G01C 21/165 |
| 9,534,917 | B2 | 1/2017 | Abuelsaad et al. | |
| 9,609,288 | B1 | 3/2017 | Richman et al. | |
| 9,678,506 | B2 | 6/2017 | Bachrach et al. | |
| 9,891,621 | B2 | 2/2018 | Bachrach et al. | |
| 9,930,298 | B2 | 3/2018 | Bevirt | |
| 9,972,212 | B1 * | 5/2018 | Sperindeo | .............. B64D 47/08 |
| 2007/0106473 | A1 | 5/2007 | Bodin et al. | |
| 2008/0267451 | A1 | 10/2008 | Karazi | |
| 2009/0157233 | A1 | 6/2009 | Kokkeby et al. | |

(Continued)

OTHER PUBLICATIONS

Notice of Allowance dated Oct. 6, 2017 for U.S. Appl. No. 15/591,883 of Bachrach, A. et al. filed May 10, 2017.

(Continued)

*Primary Examiner* — Richard R. Green
(74) *Attorney, Agent, or Firm* — Perkins Coie LLP

(57) ABSTRACT

Embodiments are described for an unmanned aerial vehicle (UAV) configured for autonomous flight using visual navigation that includes a perimeter structure surrounding one or more powered rotors, the perimeter structure including image capture devices arranged so as to provide an unobstructed view around the UAV.

23 Claims, 20 Drawing Sheets

(56) References Cited

U.S. PATENT DOCUMENTS

| | | |
|---|---|---|
| 2010/0013860 A1 | 1/2010 | Mandella et al. |
| 2010/0157055 A1 | 6/2010 | Pechatnikov |
| 2010/0191391 A1 | 7/2010 | Zeng |
| 2010/0250032 A1 | 9/2010 | Gremmert et al. |
| 2010/0277587 A1 | 11/2010 | Pechatnikov et al. |
| 2010/0305778 A1 | 12/2010 | Dorneich et al. |
| 2011/0044498 A1 | 2/2011 | Cobb et al. |
| 2011/0090399 A1 | 4/2011 | Whitaker et al. |
| 2012/0114229 A1 | 5/2012 | Zhou |
| 2012/0148162 A1 | 6/2012 | Zhang et al. |
| 2012/0236030 A1 | 9/2012 | Border et al. |
| 2013/0030875 A1 | 1/2013 | Lee et al. |
| 2013/0127980 A1 | 5/2013 | Haddick et al. |
| 2013/0271579 A1 | 10/2013 | Wang et al. |
| 2013/0278631 A1 | 10/2013 | Border et al. |
| 2013/0317667 A1 | 11/2013 | Kruglick |
| 2014/0019352 A1 | 1/2014 | Shrivastava |
| 2014/0035736 A1 | 2/2014 | Weddle et al. |
| 2014/0043436 A1 | 2/2014 | Bell et al. |
| 2014/0067160 A1 | 3/2014 | Levien et al. |
| 2014/0168461 A1 | 6/2014 | Dani et al. |
| 2014/0226024 A1 | 8/2014 | Limbaugh et al. |
| 2014/0270743 A1 | 9/2014 | Webb et al. |
| 2014/0306866 A1 | 10/2014 | Miller et al. |
| 2014/0316698 A1 | 10/2014 | Roumeliotis et al. |
| 2014/0336928 A1 | 11/2014 | Scott |
| 2015/0022640 A1 | 1/2015 | Metzler et al. |
| 2015/0158587 A1 | 6/2015 | Patrick et al. |
| 2015/0242972 A1 | 8/2015 | Lemmey et al. |
| 2015/0259078 A1 | 9/2015 | Filipovic et al. |
| 2015/0310603 A1 | 10/2015 | Moraites et al. |
| 2015/0312774 A1 | 10/2015 | Lau |
| 2016/0050840 A1 | 2/2016 | Sauder et al. |
| 2016/0054737 A1 | 2/2016 | Soll et al. |
| 2016/0070265 A1 | 3/2016 | Liu et al. |
| 2016/0122038 A1 | 5/2016 | Fleischman et al. |
| 2016/0139596 A1 | 5/2016 | Na et al. |
| 2016/0144943 A1* | 5/2016 | Cheng ................ B64C 1/06 428/188 |
| 2016/0232423 A1 | 8/2016 | Zhong et al. |
| 2016/0327950 A1 | 11/2016 | Bachrach et al. |
| 2016/0344981 A1 | 11/2016 | Lunt |
| 2017/0010623 A1 | 1/2017 | Tang et al. |
| 2017/0023937 A1 | 1/2017 | Loianno et al. |
| 2017/0024877 A1 | 1/2017 | Versace et al. |
| 2017/0180729 A1 | 6/2017 | Wu |
| 2017/0180754 A1 | 6/2017 | Wu et al. |
| 2017/0201714 A1 | 7/2017 | Kim et al. |
| 2017/0210486 A1* | 7/2017 | O'Brien ............ B64D 47/08 |
| 2017/0219347 A1 | 8/2017 | Veto |
| 2017/0227656 A1 | 8/2017 | Niesen et al. |
| 2017/0294010 A1 | 10/2017 | Shen et al. |
| 2017/0305546 A1 | 10/2017 | Ni et al. |
| 2017/0313416 A1 | 11/2017 | Mishra et al. |
| 2017/0313441 A1* | 11/2017 | Tsai .................. B64D 47/08 |
| 2017/0351933 A1 | 12/2017 | Bleiweiss |
| 2017/0357858 A1 | 12/2017 | Mendonca et al. |
| 2018/0046187 A1 | 2/2018 | Martirosyan et al. |
| 2018/0074524 A1 | 3/2018 | Yamasaki |
| 2018/0095459 A1 | 4/2018 | Bachrach et al. |
| 2018/0201272 A1 | 7/2018 | Takeda |
| 2018/0246507 A1 | 8/2018 | Bachrach et al. |

OTHER PUBLICATIONS

U.S. Appl. No. 15/791,230 of Bachrach, A. et al. filed Oct. 23, 2017.
Corrected Notice of Allowability dated Sep. 8, 2017 for U.S. Appl. No. 14/689,008 of Bachrach, A. et al. filed Apr. 16, 2015.
U.S. Appl. No. 15/894,260 of Bachrach, A. et al. filed Feb. 12, 2018.
Corrected Notice of Allowability dated May 12, 2017 for U.S. Appl. No. 14/688,998 of Bachrach, A. et al. filed Apr. 15, 2015.
International Search Report and Written Opinion dated Jul. 15, 2016, for International Application No. PCT/US2016/027921, 11 pages.
Non-Final Office Action dated Feb. 15, 2017, in U.S. Appl. No. 14/689,008 filed Apr. 16, 2015.
Non-Final Office Action dated Jun. 9, 2017 for U.S. Appl. No. 15/591,883 of Bachrach, A. et al. filed May 10, 2017.
Non-Final Office Action dated Oct. 21, 2016, in U.S. Appl. No. 14/688,998 filed Apr. 15, 2015.
Notice of Allowance dated Feb. 10, 2017, for U.S. Appl. No. 14/688,998 filed Apr. 15, 2015.
Notice of Allowance dated Jun. 20, 2017, for U.S. Appl. No. 14/689,008 of Bachrach, A. et al. filed Apr. 16, 2015.
U.S. Appl. No. 15/235,513 of Martirosyan, H. et al. filed Aug. 12, 2016.
U.S. Appl. No. 15/591,883 of Bachrach, A. et al. filed May 10, 2017.
Kakvand, P. et al., "Smart on-board UAV system: Using computer visional system to find a movable and stationery target", 2015 2nd Int'l. Conf. on Knowledge-Based Engineering and Innovation (KBEI), IEEE, Nov. 5-6, 2015, pp. 694-699.
Mansfield, Katrina et al., "Unmanned Aerial Vehicle Smart Device Ground Control Station Cyber Security Threat Model", 2013 IEEE International Conference on Technologies for Homeland Security (HST), IEEE, Nov. 12, 2013, pp. 722-728.
O'Reilly, O.M. , "Engineering Dynamics: A Primer", Chapter 2, Particles and Cylindrical Polar Coordinates, Springer Science & Business Media LLC, 2010, pp. 17-25.
Santana, Lucas Vago et al., "Outdoor waypoint navigation with the AR. Drone quadrotor", 2015 International Conference on Unmanned Aircraft Systems (ICUAS), IEEE, Jun. 9-12, 2015, pp. 303-311.
Horenstein, Henry, "Black & White Photography: A Basic Manual", Third Revised Edition, Little, Brown and Company, Chapter 6 , p. 94.
Kalnins, L. M., "Coordinate Systems" , Retrieved from the internet on Jun. 13, 2016: <URL: https://www.earth.ox.ac.ukl-larak/MMES/CoordinateSystems.pdf>.

* cited by examiner

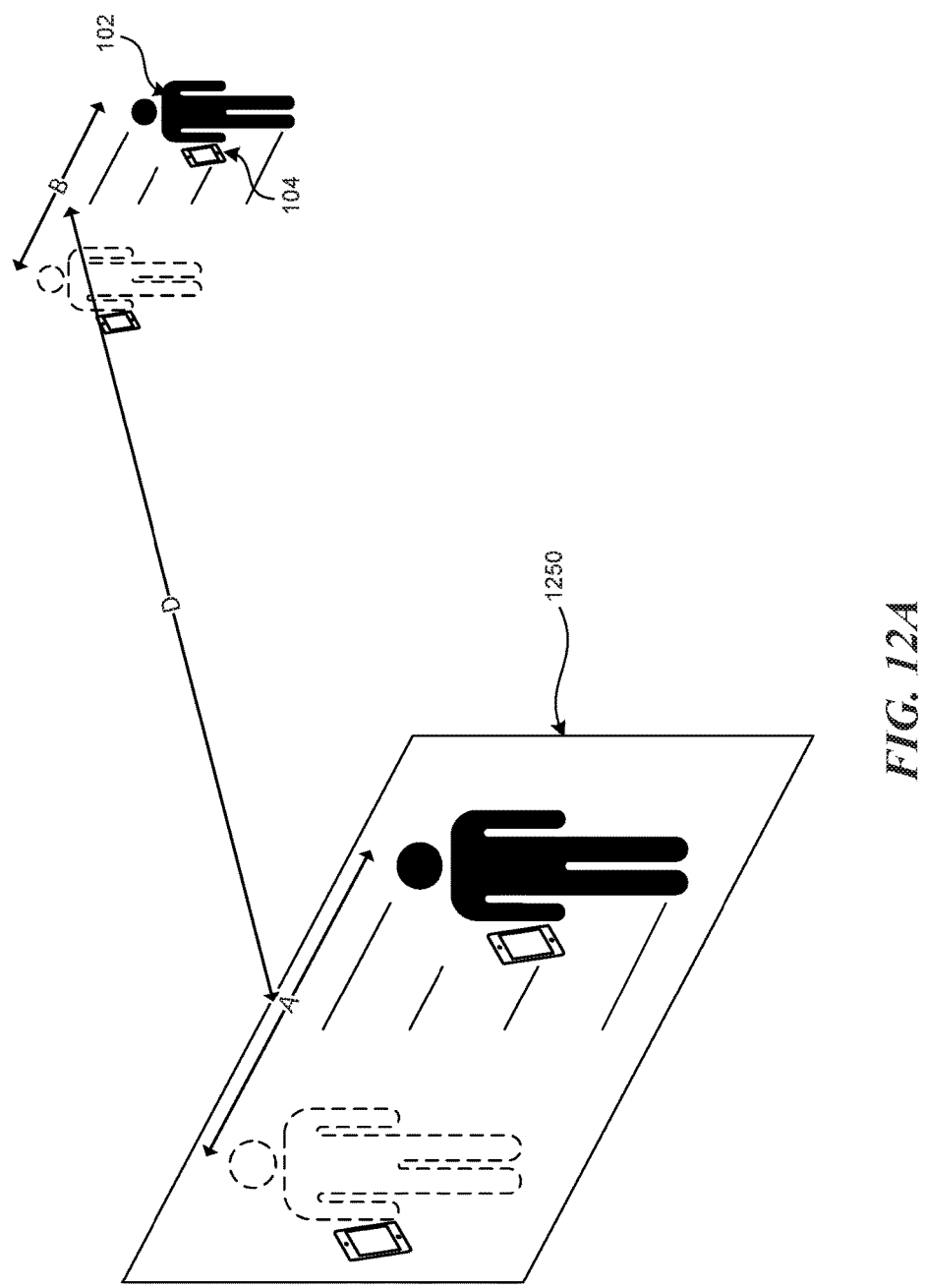

PERIMETER STRUCTURE FOR UNMANNED AERIAL VEHICLE

TECHNICAL FIELD

The present disclosure generally relates to unmanned aerial vehicles (UAV). Specifically, the present disclosure relates to UAVs configured for autonomous flight based in part on computer vision.

BACKGROUND

Unmanned Aerial Vehicles (UAVs) generally include any aircraft capable of controlled flight without a human pilot onboard. UAVs may be controlled autonomously by onboard computer processors and/or by a remotely located human pilot. Like pilot-driven helicopters, some UAVs can be configured as rotor-based aircraft. For example, several manufacturers offer commercially available UAVs that include four rotors, otherwise known as "quadcopters." Often UAVs are fitted with image capture devices such as cameras that can be configured both to record images (and video) of the surrounding environment and increasingly to facilitate autonomous visual navigation by the UAV.

BRIEF DESCRIPTION OF THE DRAWINGS

FIG. 12A-12B illustrate example methods for estimating the position and/or orientation of objects using computer vision technology.

DETAILED DESCRIPTION

Specific embodiments of the invention are described herein for purposes of illustration. Various modifications may be made without deviating from the scope of the invention. Accordingly, the invention is not limited except as by the appended claims.

Overview

An unmanned aerial vehicle (UAV) can be configured for autonomous flight based in part on data received from onboard sensors. For example, as will be described in further detail, the relative position and/or orientation of a UAV in a physical environment can be estimated based in part on images captured of the physical environment by image capture devices onboard the UAV. Capturing a full unobstructed view of the physical environment surrounding the UAV allows for more accurate position/orientation estimations. However, providing such a full unobstructed view presents a design challenge, particularly where the UAV is utilizes one or more rotors as a means for propulsion and lift, for example in the case of quadcopter. Disclosed herein are embodiments of a UAV that include a perimeter structure around the rotors upon which image capture devices can be arranged to provide a full unobstructed view around the UAV.

Perimeter Structure

Figure 1:
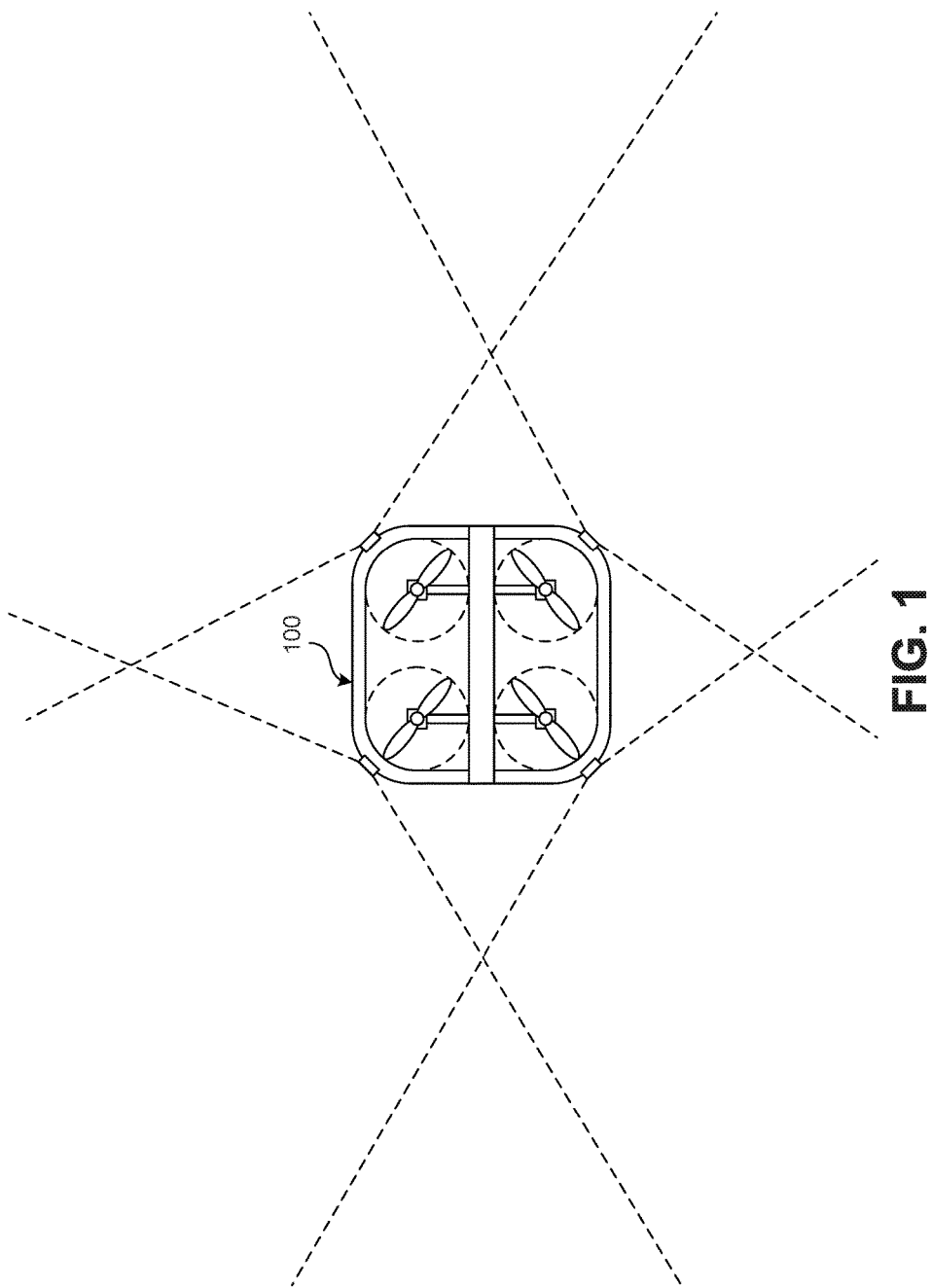
FIG. 1 shows an example unmanned aerial vehicle (UAV) configured as a quadcopter that includes a perimeter structure and a plurality of image capture devices arranged to provide a full view around the UAV.
Figure 2:
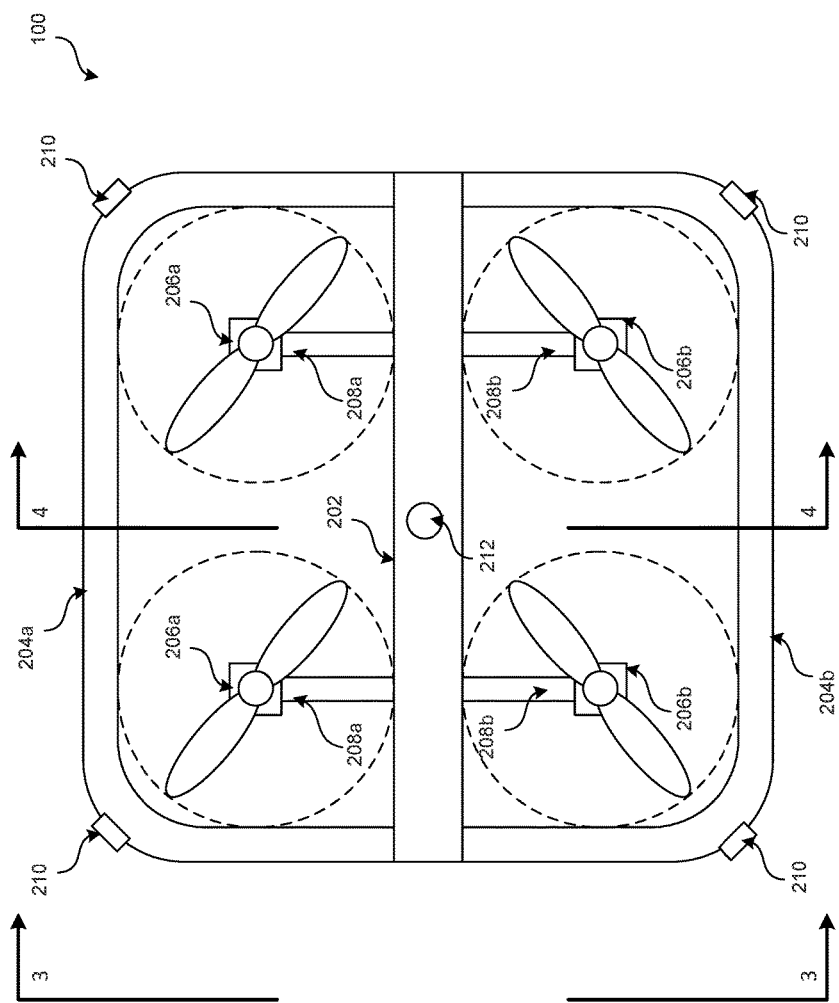
FIG. 2 shows a detailed overhead view of the example UAV of FIG. 1.

FIG. 1 shows an example UAV 100 configured as a quadcopter that includes a perimeter structure and a plurality of image capture devices arranged to provide a full 360 degree view around the UAV 100, as indicated by the dotted lines representing a field of view of each image capture device. FIG. 2 shows in greater detail, an overhead view of the example UAV 100 shown in FIG. 1. As shown in FIG. 2, UAV 100 can include a central body 202, one or more rotors 206*a-b* structurally coupled to the central body 202 by arms 208*a-b*, perimeter structure(s) 204*a-b*, one or more image capture devices 210 arranged along perimeter structure 204*a-b*, and additional image capture device(s) 212, for example arranged along central body 202. It shall be understood that UAV 100 shown in FIG. 2 is an example according to one embodiment and is provided to illustrate the concept of a perimeter structure.

Central body 202 of example UAV 100 is shown in FIG. 2 as rectangular when viewed from above suggesting a cuboid structure, however it shall be understood that central body 202 may have any shape of any dimension. In general, central body 202 may include walls that enclose an interior body space (not shown). For example the area of central body 202 that is viewable in FIG. 2 may be a top wall. In this example, a first set of rotors 206*a* are arranged on one side of central body 202 and are coupled to central body 202 by arms 208*a* that extend from a first side wall (not shown) of central body 202. Similarly, a second set of rotors 206*b* are arranged on the opposite side of central body 202 and are coupled to central body 202 by arms 208*b* that extend from a second side wall (not shown) of central body 202. As will be made more readily apparent in additional views provided in later figures, rotors 206*a-b* may be aligned along a horizontal plane relative to central body 202.

Extending from central body 202 along or generally in parallel with the aforementioned horizontal plane of central body 202 is the perimeter structure 204a-b. As shown in FIG. 2, in some embodiments, perimeter structure 204a-b may include multiple sections, for example, a first perimeter structure 204a extending from a first sidewall of central body 202 and a second perimeter structure 204b extending from a second sidewall of central body 202. As further shown in FIG. 2, perimeter structure(s) 204a-b may extend from central body 202 and may surround at least a portion of an outer edge of the one or more rotors 206a-b as represented in FIG. 2 by the dotted lines that indicate the reach of the blades of rotors 206a-b. This configuration provides two design benefits. First, it places the image capture 210 devices outside and away from the one or more rotors 206a-b. Second, perimeter structure 204a-b can protect the one or more rotors 206a-b from contact with objects in the physical environment, while UAV 100 is in flight. For example, if UAV 100 were to hit a tree while in flight, perimeter structure 204a-b would cause UAV 100 to harmlessly bounce off instead of possibly temporarily losing thrust from one or more of the rotors 206a-b or worse, permanently damaging one or more of the rotors 206a-b.

Arranged along the perimeter structure(s) 204a-b are a plurality of image capture devices 210. As previously mentioned, image capture devices 210 may be arranged so as allow for capture of unobstructed images a around UAV 100, while in use. Example UAV 100 shown in FIG. 2 includes four image capture devices 210 located at opposing corners of perimeter structure 204a-b. This represent an example arrangement, but shall not be construed to be limiting. The number and location of image capture devices will depend on a number of factors such as the type of image capture device and the requirements of the localization system (described later). For example, the image capture devices 210 shown in FIG. 2 are arranged along perimeter structure (s) 204a-b so as to provide a full 360 degree view around UAV 100, however in other embodiments, image capture devices 210 may be arranged to provide less coverage where a full 360 degree view is not necessary. In some embodiments, each of the image capture devices 210 shown in FIG. 2 may include more than one optical sensor. For example, each image capture device 210 may be a stereoscopic camera that includes two optical sensors allowing for 3D image capture and depth recovery (e.g. through computer vision algorithms) at around UAV 100. In some embodiments, fewer than four image capture devices 210 may be sufficient to provide an unobstructed view around UAV 100, for example through the use of "fisheye" lenses. According to some embodiments the position and orientation of each image capture device 201 may be calibrated to an onboard inertial measurement unit (IMU) (not shown). According to some embodiments, a monocular navigation algorithm may be run for each image capture device paired with an onboard IMU and as the relative position and orientation calibration is dialed in, stereo correspondence may be performed on observed primitives representing a pair of corresponding image features captured by a pair of cameras in order to provide a more robust estimation of distance to the objects.

In addition to image capture devices 210 arranged along perimeter structure 204a-b, UAV 100 may also include one or more additional image capture device(s) 212 arranged along central body 202. For example, image capture device 212 shown in FIG. 2 is located along the top wall of central body 202 providing a view above UAV 100, while in use. Similarly another image capture device may be located along an opposing bottom wall (not shown) to provide a view below the UAV 100. It should be noted that these additional image capture devices 212 may, in some embodiments be arranged along perimeter structure 204a-b.

Figure 3:
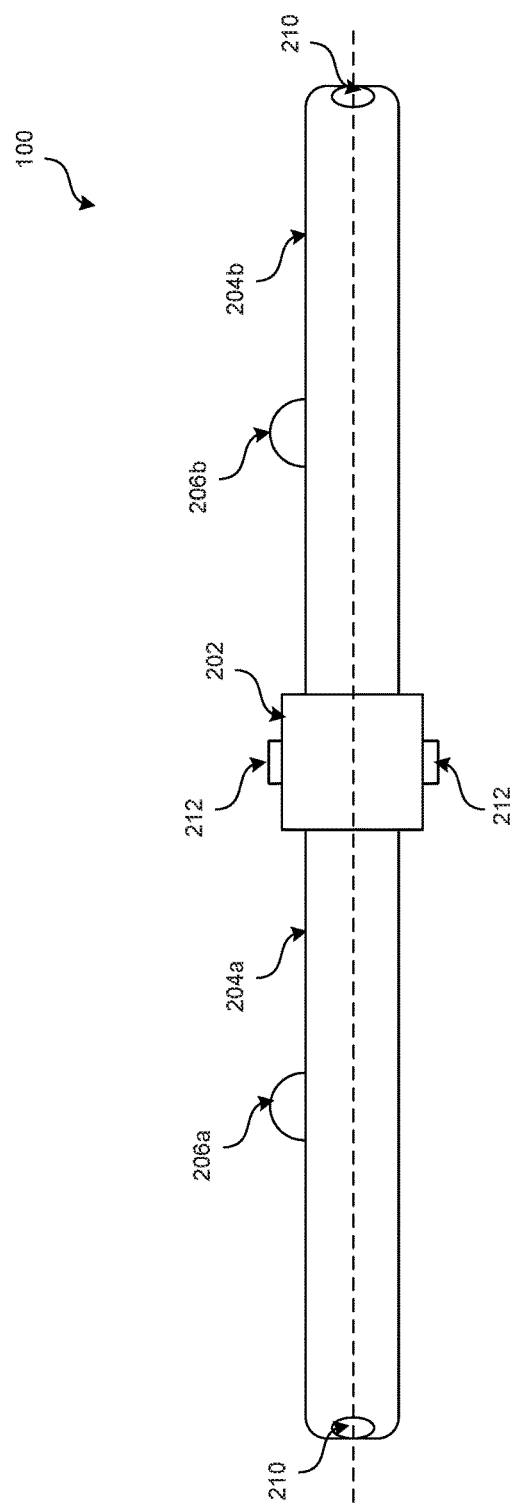
FIG. 3 shows a side view of the example UAV of FIG. 1.

FIG. 3 shows a side view of the example UAV 100. The location of the view in FIG. 3 is indicated in FIG. 2 by view arrows marked with the number 3. A shown in FIG. 3, in some embodiments, perimeter structure 204a-b extends from the central body 202 along or generally in parallel with a horizontal plane (as indicated by the dotted line) relative to central body 202. Note, example perimeter structure 204a-b is shown in FIG. 3 in an exemplary form to illustrate the concept. The perimeter structure may have alternative shapes or dimensions and may be oriented differently relative to the indicated horizontal plane while remaining within the scope of the presently described innovation. Further, the one or more rotors 206a-b (mostly obscured in FIG. 3 by perimeter structure 204a-b) may be structurally coupled to central body 212 and aligned along or generally in parallel with the same horizontal plane. Again, the example embodiment is provided to illustrate the concept and is not intended to be otherwise limiting. Rotors 206a-b may be arranged in an alternative configuration (e.g. angled or otherwise) while remaining within the scope of the presently described innovation. Also as shown in FIG. 3 and as alluded to previously with respect to FIG. 2, another image capture device 212 may be located along an opposing bottom wall to provide a view below the UAV 100, while in use.

Figure 4:
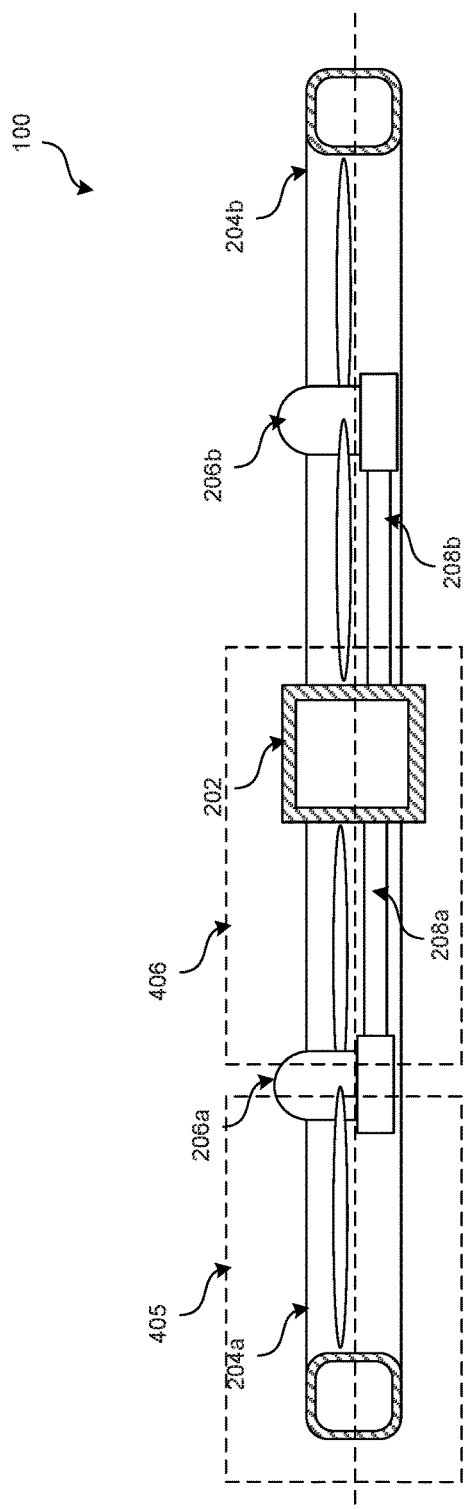
FIG. 4 shows a cross section of the example UAV of FIG. 1.

FIG. 4 shows cross section of the example UAV 100. The location of the view in FIG. 4 is indicated in FIG. 2 by view arrows marked with the number 4. Details of the cross section shown in FIG. 4 are provided at FIGS. 5 and 6 as indicated by the dotted line boxes 405 and 406, respectively. As shown in FIG. 4, in some embodiments, rotors 206a-b are structurally coupled to central body 202 by one or more arms 208a-b. Arms 208a-b may enclose mechanical and/or electrical components needed to deliver mechanical and/or electrical power to rotors 206a-b. In some embodiments, arms 208a-b are configured to be fixed in place relative to central body 202. For example, in the case of some quadcopters, flight control is accomplished by varying the thrust to otherwise fixed rotors. Alternatively, in some embodiments, control flight control may be accomplished by, for example, varying the angle of one or more of the rotors relative to the central body. In such an embodiment, arms 208a-b may include one or more actuated members configured to vary the angle of rotors 206a-b. As mentioned, rotors 206a-b are shown in FIG. 4 as aligned substantially in parallel with a horizontal plane of central body 202 and perimeter structure 204a-b. It shall be understood that this example configuration is shown for illustrative purposes and is not to be construed as limiting. For example, in some embodiments one or more of rotors 206a-b may be permanently or temporarily oriented at an angle relative to the horizontal plane of central body 202.

Figure 5:
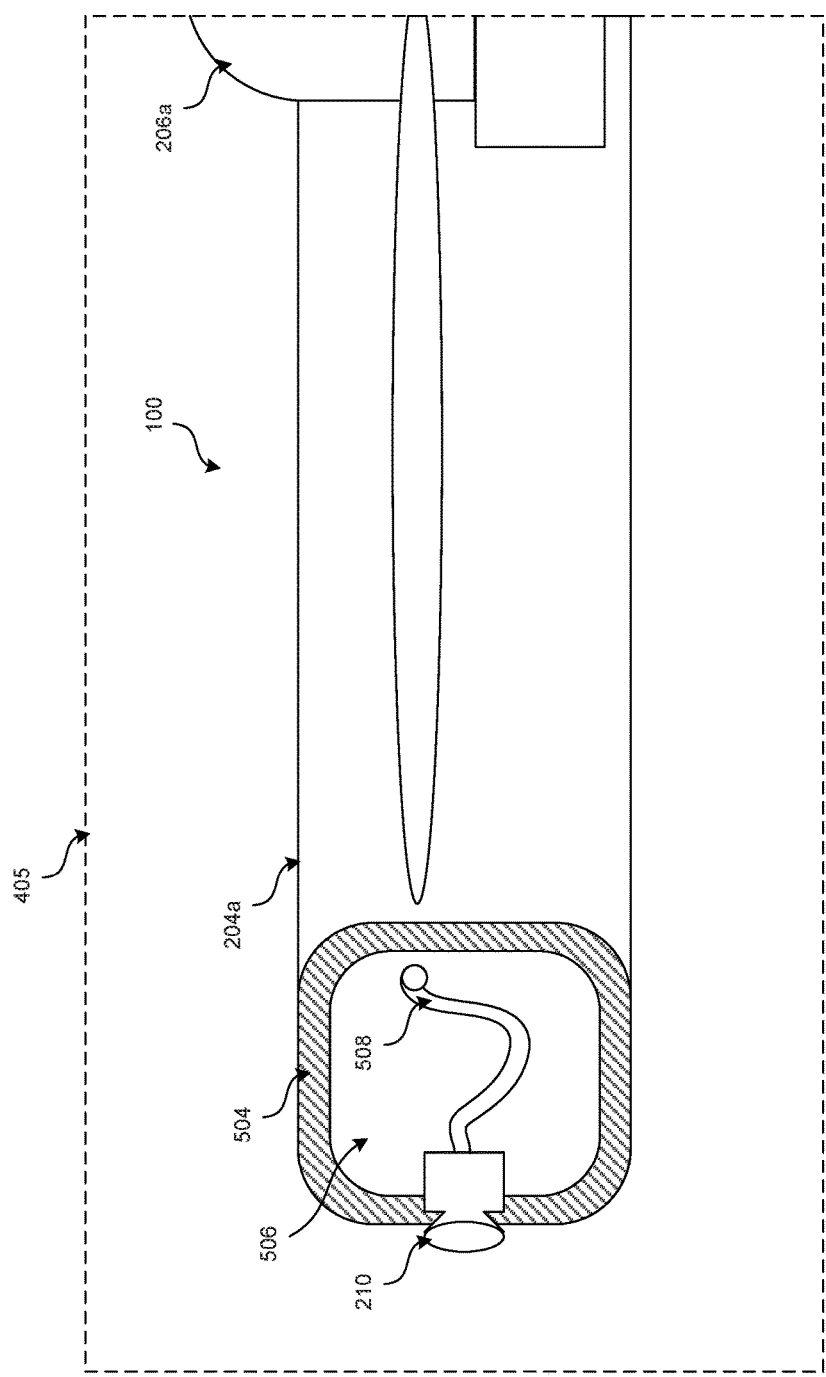
FIG. 5 shows a first detailed cross section of the example UAV of FIG. 1.

As mentioned, FIG. 5 shows a first detail of the cross section of the example UAV 100 shown in FIG. 4 as indicated by dotted line box 405. As shown in FIG. 5, in some embodiments, perimeter structure 204a-b has a hollow (e.g. "tubular") construction that includes one or more walls 504 surrounding an interior space 506. Wall 504 may be made of any material or combination of materials that that have strength and weight characteristics suitable for use in an aircraft. For example, in some embodiments wall 504 can be made of plastic, metal (e.g. aluminum), carbon fiber, synthetic fiber (e.g. Kevlar®), or some sort of composite material such as carbon or glass fiber embedded in an epoxy resin.

As previously mentioned, image capture devices 210 may be structurally coupled to the perimeter structure 204a-b. Specifically, as shown in FIG. 5, in some embodiments, these image capture devices 210 may be embedded in the wall 504 of the perimeter structure 204a-b and face outwards from the central body 202 so as to capture images of the physical environment around UAV 100, while in use. In some embodiments image capture devices 210 are communicatively coupled to a processing unit such as a flight controller (not shown) of UAV 100 via some type of interconnect (e.g. wires 508) arranged within the interior space 506 of perimeter structure 204a-b. In some embodiments, one or more additional components of system 1300 of UAV 100 described with respect to FIG. 13 may also be embedded in wall 504 or located within interior space 506 of perimeter structure 204a-b. For example, one or more additional sensors (e.g. IMU 1328, accelerometer, 1326, proximity sensor 1330, microphone/speaker 1350, etc.) may be embedded in wall 504 or located within interior space 506.

Figure 6:
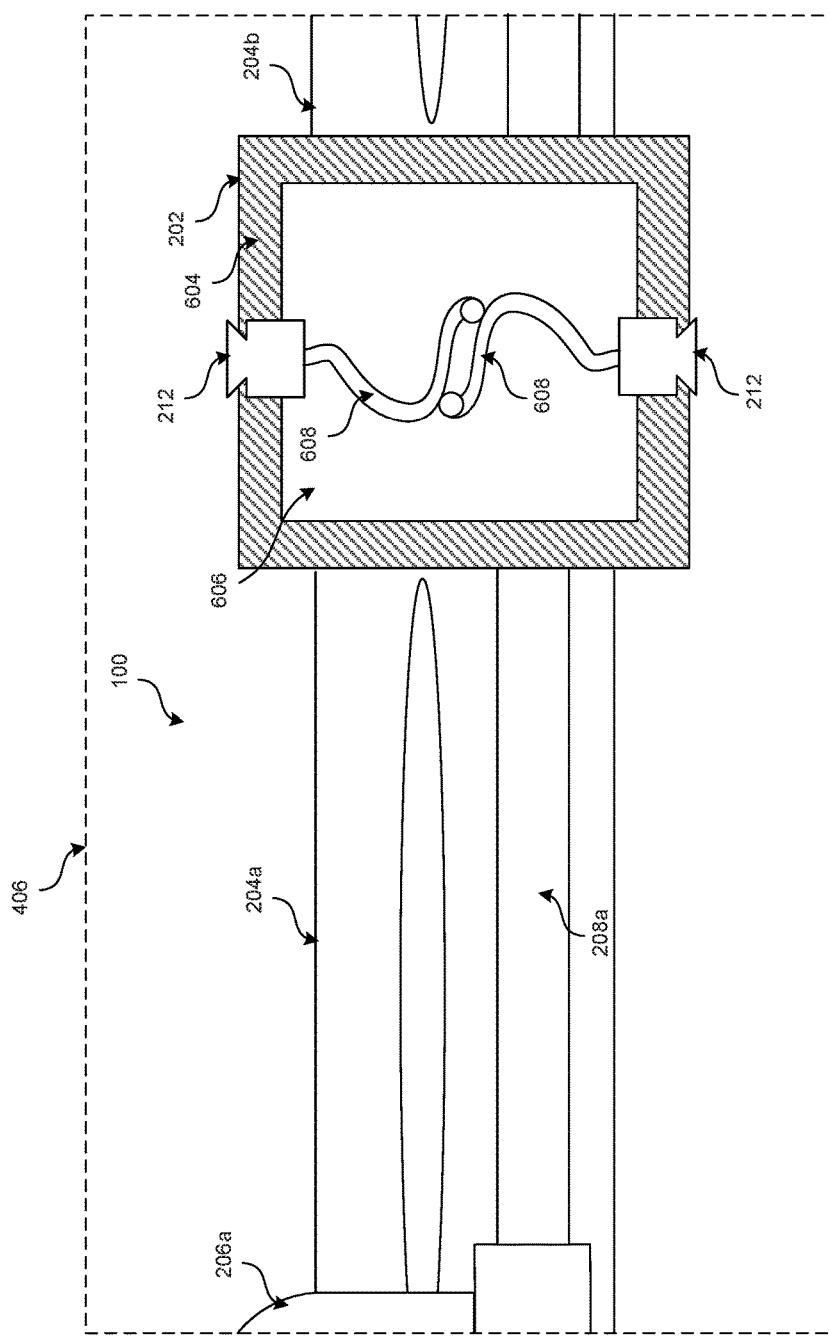
FIG. 6 shows a second detailed cross section of the example UAV of FIG. 1.

FIG. 6 shows a second detail of the cross section of the example UAV 100 shown in FIG. 4 as indicated by dotted line box 406. As shown in FIG. 6, in some embodiments, central body 202 also has a hollow construction that includes one or more walls 604 surrounding an interior space 606. As with perimeter structure 204a-b, walls 604 of central body may be made of any material or combination of materials that that have strength and weight characteristics suitable for use in a an aircraft. For example, in some embodiments walls 604 can be made of plastic, metal (e.g. aluminum), carbon fiber, synthetic fiber (e.g. Kevlar®), or some sort of composite material such as carbon fiber embedded in an epoxy resin.

As previously mentioned, additional image capture devices 212 may be structurally coupled to the central body 202. Specifically, as shown in FIG. 6, in some embodiments, these image capture devices 212 may be embedded in the wall 604 of the central body 202 and face outwards from the central body 202 so as to capture images of the physical environment above and below the UAV 100, while in use. In some embodiments image capture devices 212 are communicatively coupled to a processing unit such as a flight controller (not shown) of UAV 100 via some type of interconnect (e.g. wires 608) arranged within the interior space 606 of central body 202. In some embodiments, one or more additional components of system 1300 of UAV 100 described with respect to FIG. 13 may also be embedded in wall 604 or located within interior space 606 of perimeter structure 204a-b. For example, one or more additional sensors (e.g. IMU 1328, accelerometer, 1326, proximity sensor 1330, microphone/speaker 1350, etc.) may be embedded in wall 604 or located within interior space 606.

It should be noted that the cross sections of perimeter structure 204a-b and central body 202 shown in FIGS. 4-6 are exemplary and are provided for illustrative purposes. The example cross sections are not intended to be limiting with respect to shape, orientation, or dimensions. The particular shape and dimensions (e.g. thickness of walls 504 or 604) can vary depending on a number of factors such as, the overall dimensions of UAV 100, the type of image capture devices 210, 212 used, the type of materials used for walls 504, 604, and the available thrust from rotors 206a-b, and the included components of system 1300. The possible components of system 1300 are described in more detail later with respect to FIG. 13.

The structural components of UAV 100 (e.g. central body 202, perimeter structure 204a-b, and arms 208a-b) may be manufactured using any standard manufacturing techniques depending on the materials uses. For example in some embodiments, these structural components can be manufactured using pressure molding (e.g. for carbon fiber), injection molding (e.g. for plastics), machining (e.g. for metals), 3D printing, or any combination thereof. Further, the previously described structural components may each be manufactured as one or more sub components or as a single overall component. For example, in some embodiments, central body 202 and perimeter structure 204a-b are formed as a single structural body (e.g. through an injection molding or 3D printing process). Alternatively the single structural body may be formed as two components (e.g. a top half and bottom half) and assembled, for example using fasteners, glue, tape, or mechanical clips.

FIGS. 7A-7E show a series of alternative configurations for a UAV with a perimeter structure.

Figure 7A:
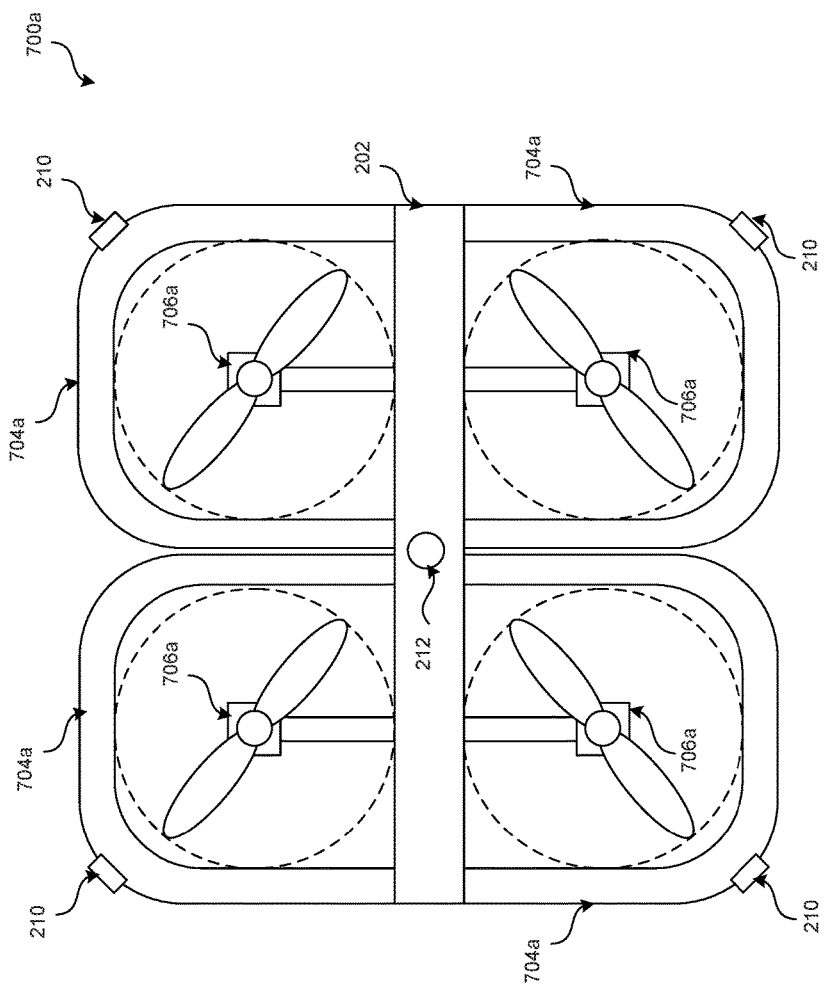
FIG. 7A shows an overhead view of a first alternative embodiment of the example UAV of FIG. 1.

FIG. 7A shows a first alternative embodiment 700a that is similar to UAV 100 described with respect to FIG. 2 except perimeter structures 704a extend from central body 202 and surround the outer edge of each of the four rotors 706a as represented in FIG. 7A by the dotted lines that indicate the reach of the blades of rotors 706a.

Figure 7B:
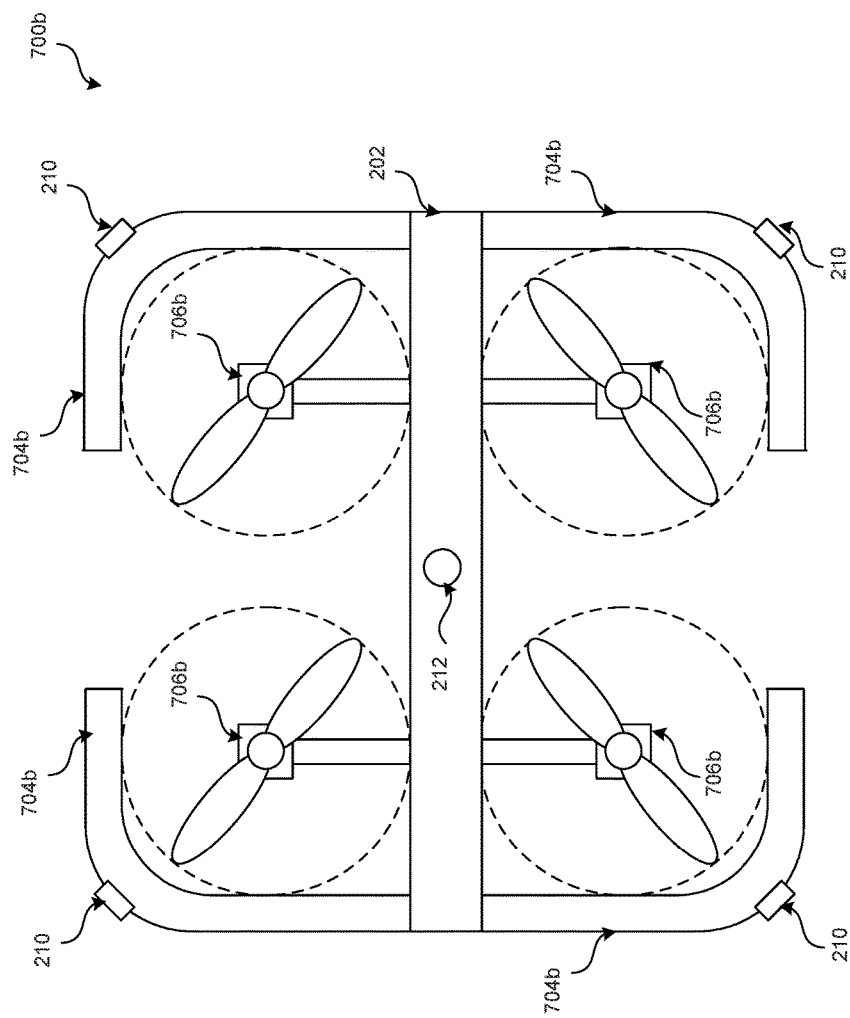
FIG. 7B shows an overhead view of a second alternative embodiment of the example UAV of FIG. 1.

FIG. 7B shows a second alternative embodiment 700b that is similar to UAV 100 described with respect to FIG. 2 except perimeter structures 704b extend from central body 202 and surround only a portion of the outer edge of each of the four rotors 706b as represented in FIG. 7B by the dotted lines that indicate the reach of the blades of rotors 706b.

Figure 7C:
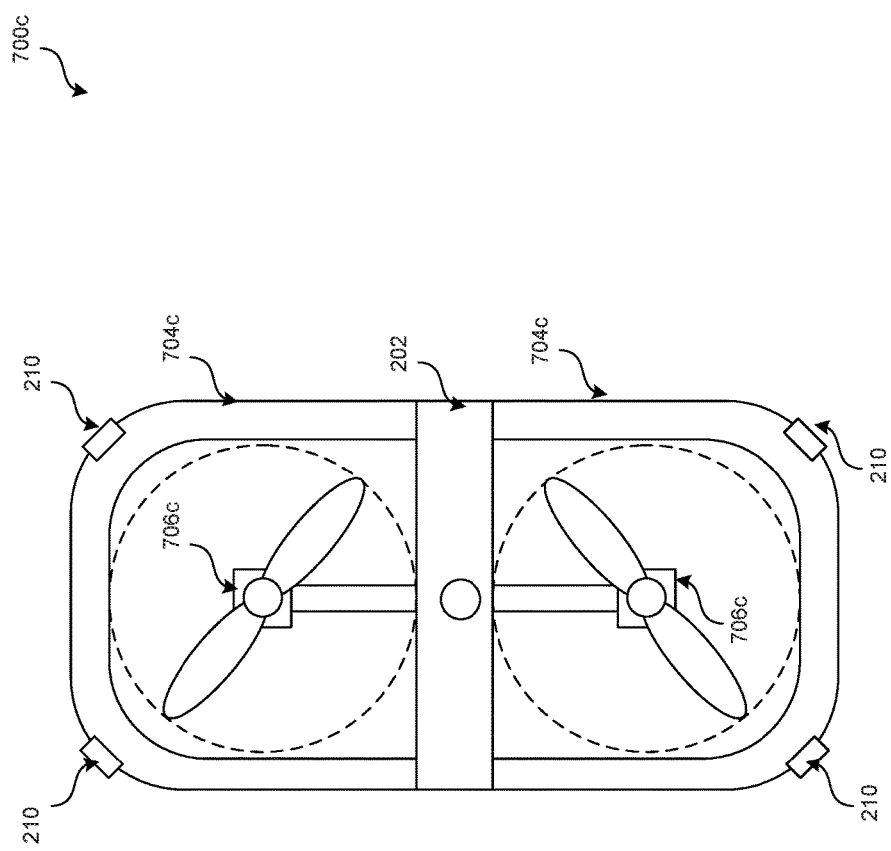
FIG. 7C shows an overhead view of a third alternative embodiment of the example UAV of FIG. 1.

FIG. 7C shows a third alternative embodiment 700c that is similar to UAV 100 described with respect to FIG. 2 except perimeter structures 704c extend from central body 202 and surround the outer edge of each of two rotors 706c as represented in FIG. 7B by the dotted lines that indicate the reach of the blades of rotors 706c.

Figure 7D:
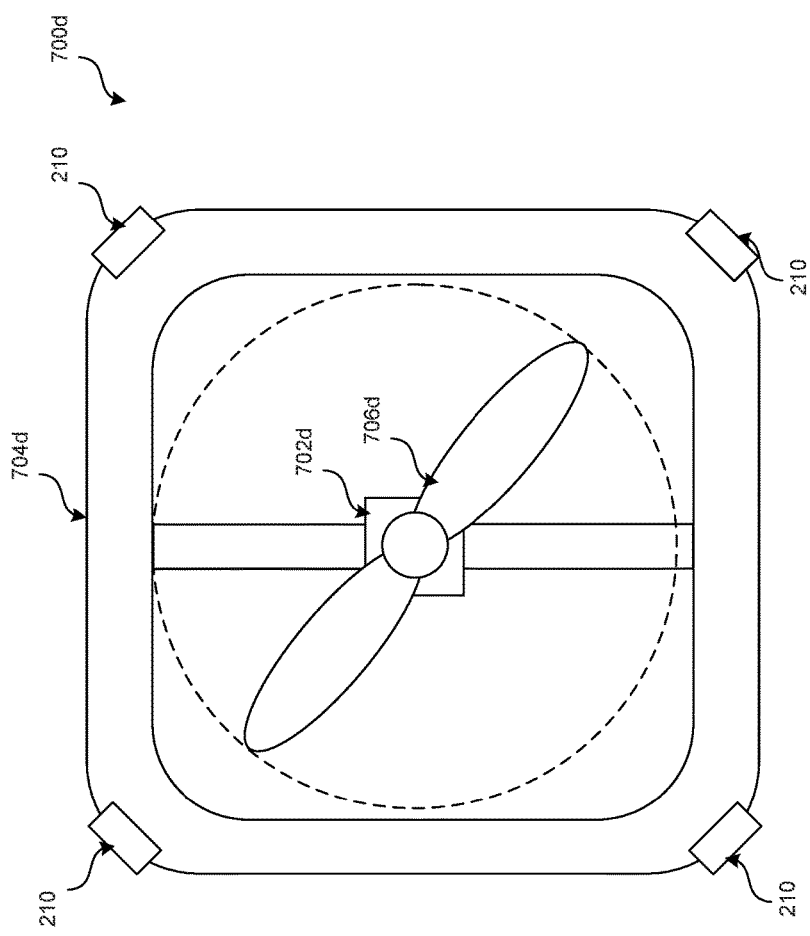
FIG. 7D shows an overhead view of a fourth alternative embodiment of the example UAV of FIG. 1.

FIG. 7D shows a fourth alternative embodiment 700d that is similar to UAV 100 described with respect to FIG. 2 except perimeter structures 704d extend from central body 702d and surround the outer edge of a single rotor 706d as represented in FIG. 7D by the dotted lines that indicate the reach of the blades of rotor 706d.

Figure 7E:
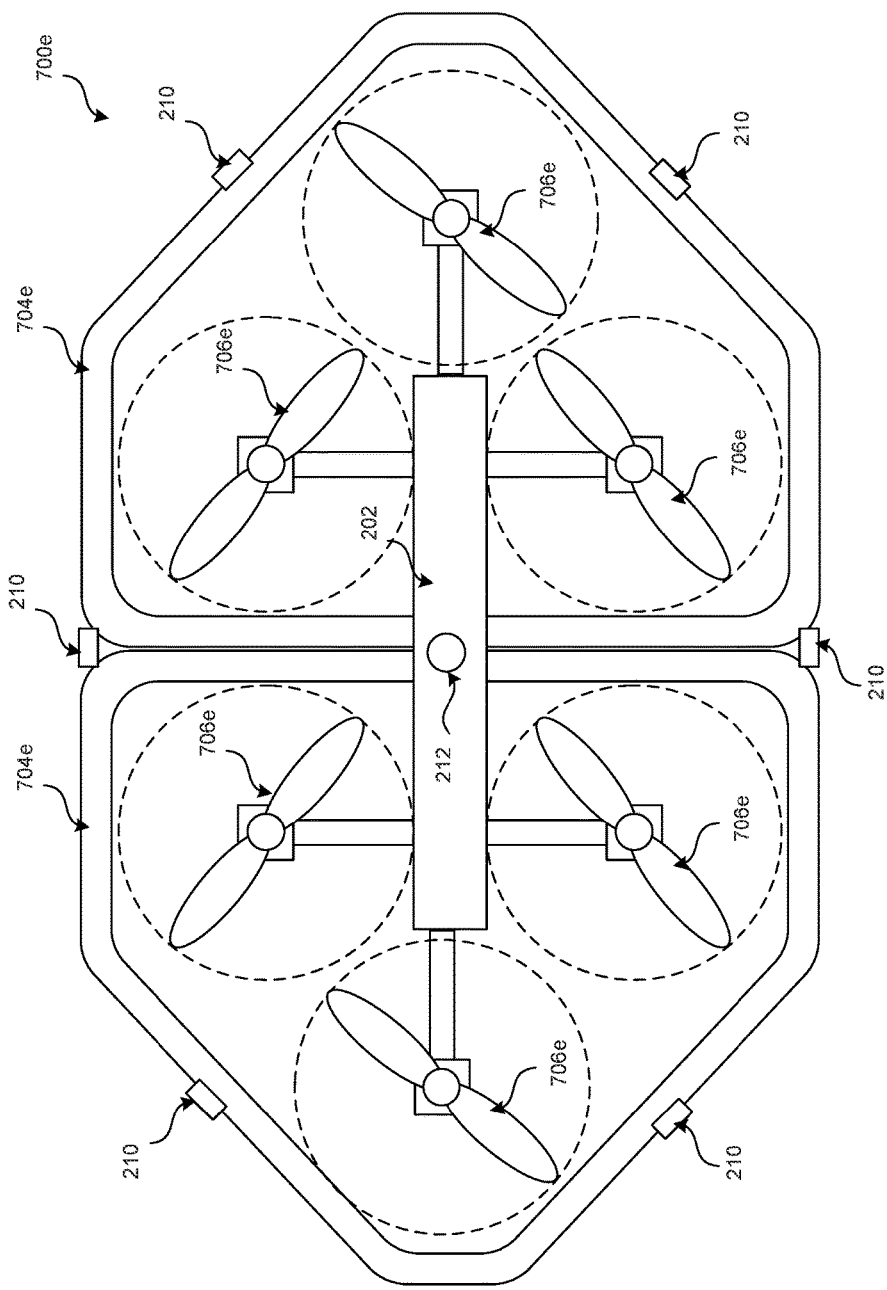
FIG. 7E shows an overhead view of a fifth alternative embodiment of the example UAV of FIG. 1.

FIG. 7E shows a fifth alternative embodiment 700e that is similar to UAV 100 described with respect to FIG. 2 except perimeter structures 704e extend from central body 202 and surround at least a portion of the outer edges of six rotors 706d as represented in FIG. 7E by the dotted lines that indicate the reach of the blades of each of rotors 706d. Further as shown in FIG. 7E, embodiment 700e of UAV includes additional image capture devices 210 due to the geometry of perimeter structure 704e surrounding the rotors 706e. The additional image capture devices 210 in embodiment 700e may facilitate image capture a full 360 degrees around the UAV of embodiment 700e.

Alternative embodiments 700a-700e, previously described with respect to FIGS. 7A-7E (respectively) are provided to illustrate by examples how a perimeter structure of a UAV may be reconfigured while staying within the scope of the innovations described herein. The list of alternative embodiments is not exhaustive and is not intended to limit the scope of the innovation.

Figure 7F:
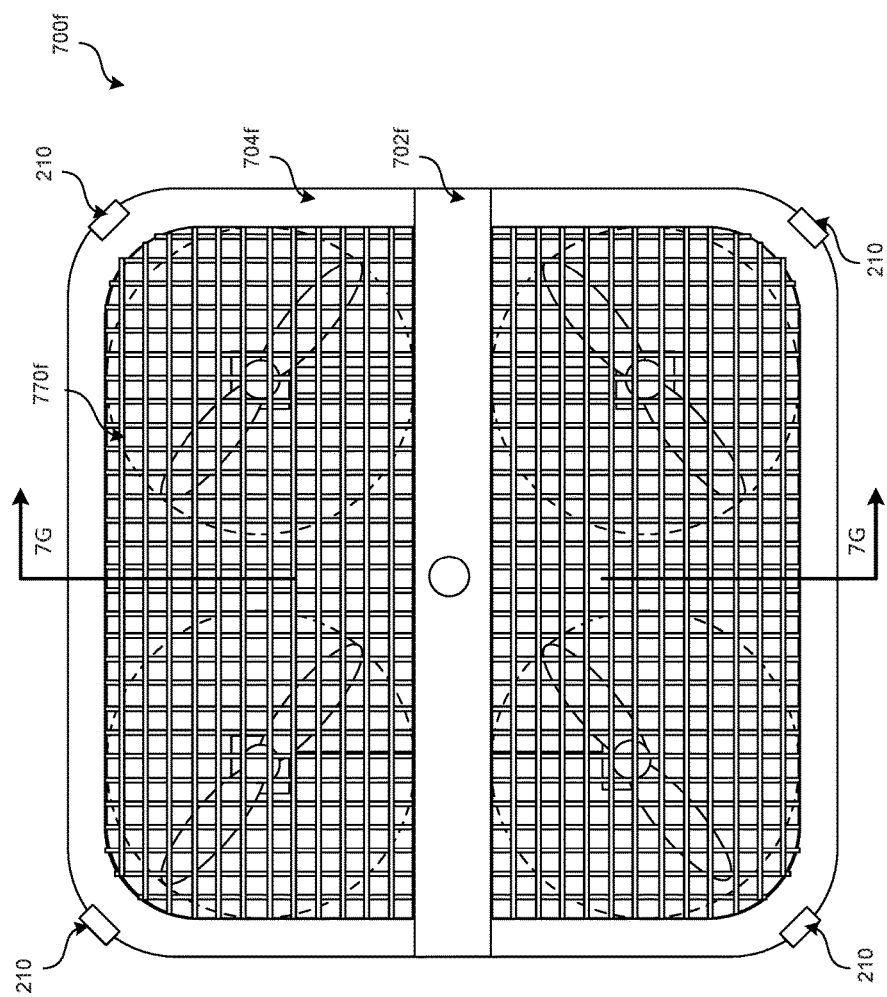
FIG. 7F shows an overhead view of an example UAV that includes a protective structure above and/or below its rotors.

A UAV according to the present teachings may further include a protective structure above and below the rotors to further protect them from collision with foreign objects. FIG. 7F shows an overhead view of an example UAV 700f that includes a protective structure 770f in the form of a grating above and below the rotors. Example UAV 700f may be similar to UAV 100 described with respect to FIG. 2, except that a protective structure 770f covers (at least in part) openings defined by the top and bottom edges of perimeter structure 704f and central body 702f. This is further illustrated in the cross section view of UAV 700f shown in FIG. 7G. In some embodiments, protective structure 770f is configured to prevent collision between the rotors of UAV 700f and foreign objects, while allowing air to pass through so that the rotors are able to provide thrust. For example, protective structure 770f may include a grating comprising a plurality of cross hatched members, as shown in FIG. 7F. The cross hatched members 770f may be made of any suitable material, for example plastic, metal, carbon fiber, glass fiber, etc. The example structure 770f is shown in FIG. 7F with a particular cross hatch configuration for illustrative purposes, but is not to be construed as limiting. In some embodiments, protective structure may have more or fewer cross hatch members (e.g protective structure 770f may include a screen with many thin members forming small openings), may include members oriented at different angles (e.g. diagonally), or may include variations in the grating structure across a top surface area of UAV 700f.

Figure 7G:
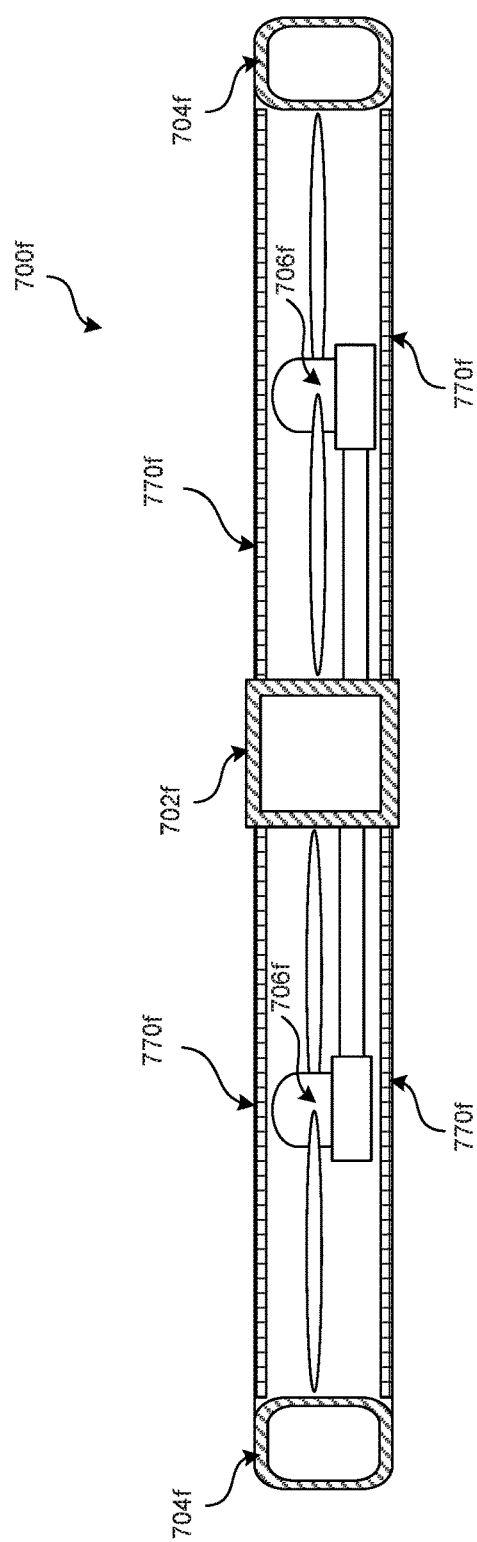
FIG. 7G shows a cross section of the example UAV of FIG. 7F.

As mentioned, FIG. 7G shows a cross section view of UAV 700f. The view in FIG. 7G is defined by view lines labeled 7G in FIG. 7F. As shown in FIG. 7G, protective structure(s) 770f may cover at least a portion of the openings defined by the top and bottom edges of central body 702f and perimeter structure(s) 704f, thereby protecting rotors 706f from colliding with foreign objects from above or below. In this way, protective grating structure 770f may provide additional protection fro rotors 706f not otherwise provided by perimeter structure 704f. Again, the example protective structure(s) 770f are shown in FIG. 7G for illustrative purposes and are not to be construed as limiting as to shape, orientation, or dimension. In some embodiments, protective structure 770f may be formed as part of perimeter structure 704f. For example, protective structure 770f and perimeter structure 704f may formed (e.g. through an injection molding or 3D printing process) as a top portion and a bottom portion and assembled to form the overall structure illustrated in FIGS. 7F-7G.

A UAV 100 according to the present teachings may include an image capture adjustment and stabilization system. Capturing images and video from a vehicle in motion (such as from a UAV 100) may lead to quality issues such as blur, shake, and disorientation. Image stabilization may generally refer to techniques used to counter these effects and produce a clear stable image even when captured by a vehicle in motion.

Figure 8A:
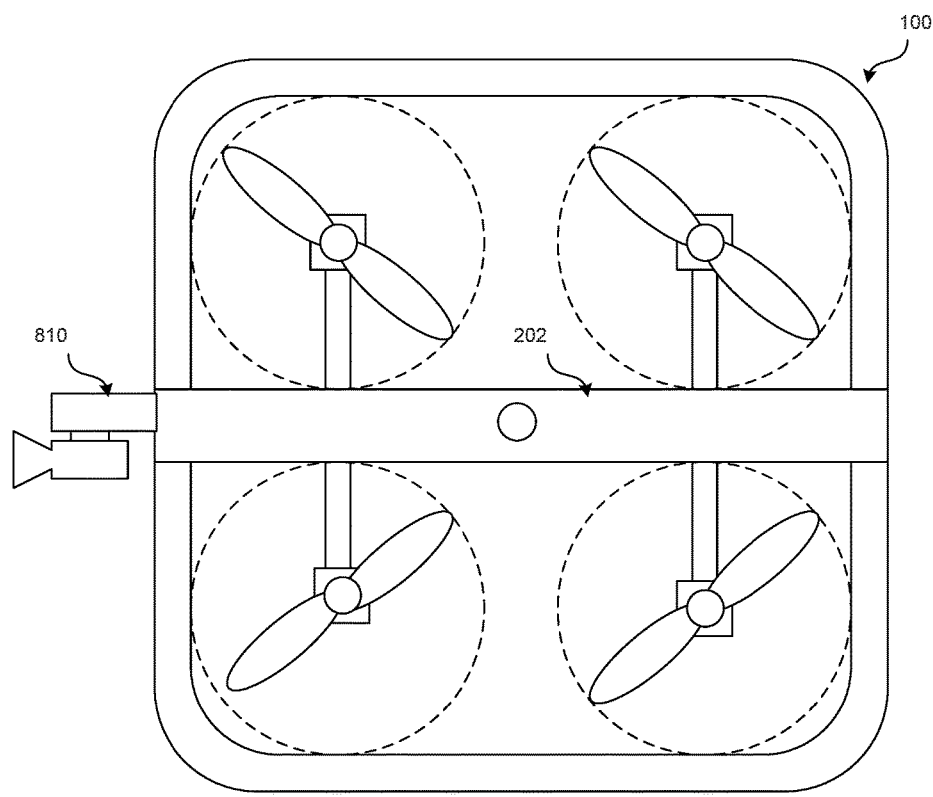
FIG. 8A shows an overhead view of an example UAV that includes a gimbaled image capture device.

FIG. 8A shows an overhead view of the example UAV 100 (similar to as described with respect to FIG. 2) that includes an additional gimbaled image capture device 810, that according to some embodiments may be configured for stabilized tracking and filming of a subject (e.g. a human subject) in the physical environment surrounding the UAV, while the UAV is in flight. In some embodiments, gimbaled image capture device 810 may include a multi-axis mechanical gimbal device that may, through the use of gyroscopes and mechanical actuators along two or more axis, physically stabilize an image capturing device (e.g. a camera) coupled to central body 202 of UAV 100. In other embodiments, gimbaled image capture device 810 may include a hybrid digital-mechanical gimbal system that combines mechanical gimballing along one or two axis with image processing provides the effect of gimbaling on an additional axis. For example, FIG. 8B shows a side view of the UAV 100 shown in FIG. 8A along with the gimbaled image capture device 810.

Figure 8B:
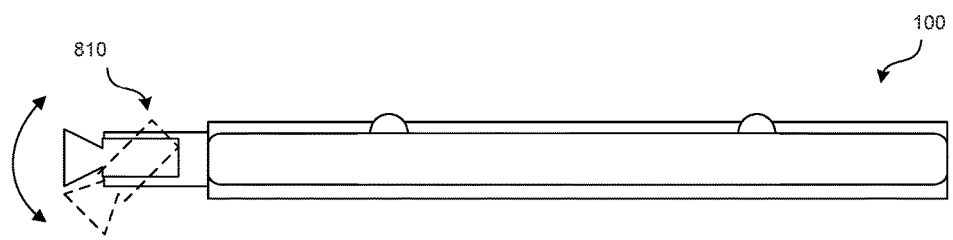
FIG. 8B shows a side view of the example UAV of FIG. 8A.

As shown in FIG. 8B, gimbaled image capture device 810 may include a mechanical gimbal configured to adjust the orientation of the image capture device along at least one axis. For example, the gimbaled image capture device 810 may be configured to mechanically adjust at least the pitch of image capture device 810 as suggested by the arrows and dotted line object in FIG. 8B. It shall be understood that a gimbaled image capture device 810 may be configured to mechanically adjust the orientation along more than one axis, for example yaw and roll in addition to pitch Adjusting pitch as opposed to roll or yaw, would allow for overall camera range of motion where the UAV 100 is a rotor-based (as opposed to fixed-wing) aircraft, for example a quadcopter as shown in FIGS. 8A-8B. This has to do with the way in which the flight of a quadcopter is controlled. Generally, a quadcopter is controlled by varying the orientation of its vertical axis. In other words, in a hover the quadcopter's vertical axis is perpendicular to the ground. In order to move left or right, forwards or backwards, the angular velocity of the four rotors are adjusted, and the quadcopter tilts in the direction that it intends to move. This method of control leaves the quadcopter free to determine yaw, thus effectively "gimbaling" the image capture device 810 along the yaw axis. Accordingly, utilizing a pitch gimbal gives maximum possible view range of motion since the yaw of the image capture device is easily controlled by adjusting the yaw of the quadcopter itself and the roll of the image capture device is easily controlled through digital image processing, for example simple image rotation transforms.

Localization and Navigation

Figure 9:
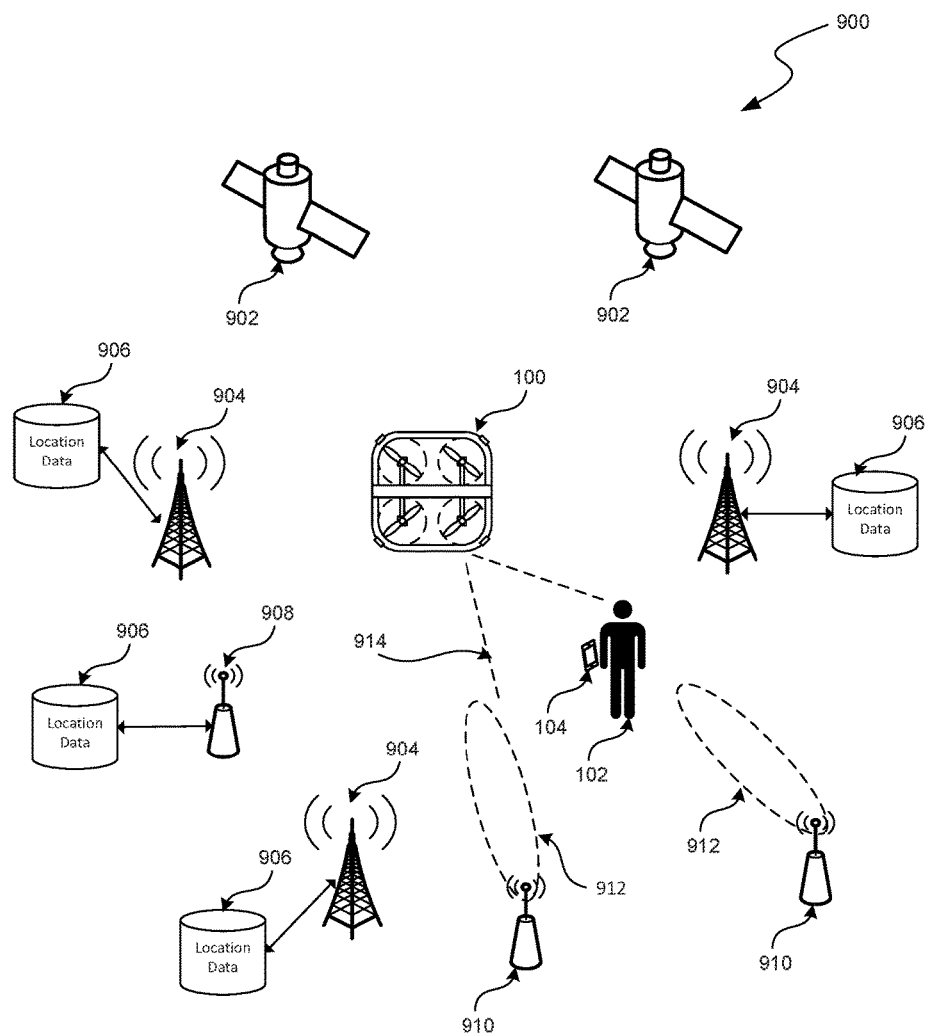
FIG. 9 shows a conceptual diagram of a localization and navigation system for guiding navigation and image/video capture by a UAV

FIG. 9 is a high-level illustration of a localization and navigation system 900, according to some embodiments, for guiding navigation and image/video capture by a UAV 100. According to some embodiments, a relative position and/or pose (position+orientation) of the UAV 100, a relative position and/or pose of the subject, and/or a relative position and/or pose of an object in the physical environment surrounding UAV 100 may be determined using one or more of the subsystems illustrated in FIG. 9. Further, this relative position and/or pose data may be used by the UAV 100 to navigate and to track subjects for image and/or video capture. According to the present teaching localization system 900 may include an UAV 100, a GPS system comprising multiple GPS satellites 902, a cellular system comprising multiple cellular antennae 204 (with access to sources of localization data 906), a Wi-Fi system comprising multiple Wi-Fi routers 908 (with access to sources of localization data 906), and a portable multifunction device (PMD) 104 operated by a user 102.

In some embodiments, PMD 104 may include mobile, hand held or otherwise portable computing devices that may be any of, but not limited to, a notebook, a laptop computer, a handheld computer, a palmtop computer, a mobile phone, a cell phone, a PDA, a smart phone (e.g., iPhone®, etc.), a tablet (e.g., iPad®, etc.), a phablet (e.g., HTC Droid DNA™, etc.), a tablet PC, a thin-client, a hand held console, a handheld gaming device or console (e.g., XBOX®, etc.), mobile-enabled powered watch (e.g., iOS, Android or other platform based), a smart glass device (e.g., Google Glass™, etc.) and/or any other portable, mobile, hand held devices, etc. running on any platform or any operating system (e.g., OS X, iOS, Windows Mobile, Android, Blackberry OS, Embedded Linux platforms, Palm OS, Symbian platform, Google Chrome OS, etc.). A PMD 104 may also be a simple electronic device comprising minimal components. For example, a PMD may simply include sensors for detecting motion and/or orientation and a transmitter/receiver means for transmitting and/or receiving data.

As mentioned earlier, a relative position and/or pose (position+orientation) of the UAV 100, a relative position and/or pose of the subject (e.g. user 102), and/or a relative position and/or pose of a PMD 104 operated by a user 102 may be determined using one or more of the subsystems illustrated in FIG. 9. For example, using only the GPS system 902, a position on the globe may be determined for any device comprising a GPS receiver (e.g. the UAV 100 and/or the PMD 104). While GPS by itself in certain implementations may provide highly accurate global positioning it is generally is not capable of providing accurate information regarding orientation. Instead a technique of multiple inputs and multiple outputs ("MIMO") (as illustrated in FIG. 9) may be used for localization, potentially in conjunction with other localization subsystems Consider the example based on the illustration in FIG. 9; a user 102 is utilizing an autonomous UAV 100 via a PMD 104 to film herself overhead. In order navigate the UAV 100 and inform the tracking by an image capture device of the subject (in this case the user), a relative position and orientation of the UAV 100 relative to the PMD 104 (or any other point of reference) may be necessary.

A relative position between the UAV 100 and the PMD 104 may be determined using a GPS system to determine a global position of the UAV 100, a global position of the PMD 104 and compare the two.

Similarly, using an array of cellular and or/Wi-fi antennae, a position relative to the known locations of antennae may be determined for both the UAV and PMD using known positioning techniques. Some known positioning techniques include those based on signal trilateration, for example round trip time of arrival (RTT) in which a signal is sent and received by a signal transceiver and distance is calculated based on the elapsed time, received signal strength (RSS) in which the power levels of the transmitted signal and the received signals are analyzed and a distance determined based on a known propagation loss. Other known positioning techniques include those based on signal triangulation, for example angle of arrival (AoA) in which angles of arriving signals are determined and through applied geometry a position determined. Current Wi-Fi standards, such as 803.11n and 802.11ac, allow for RF signal beamforming (i.e. directional signal transmission using phased-shifted antenna arrays) from transmitting Wi-Fi routers. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 9 by dotted lines 912 emanating from WiFi routers 910.

Figure 10:
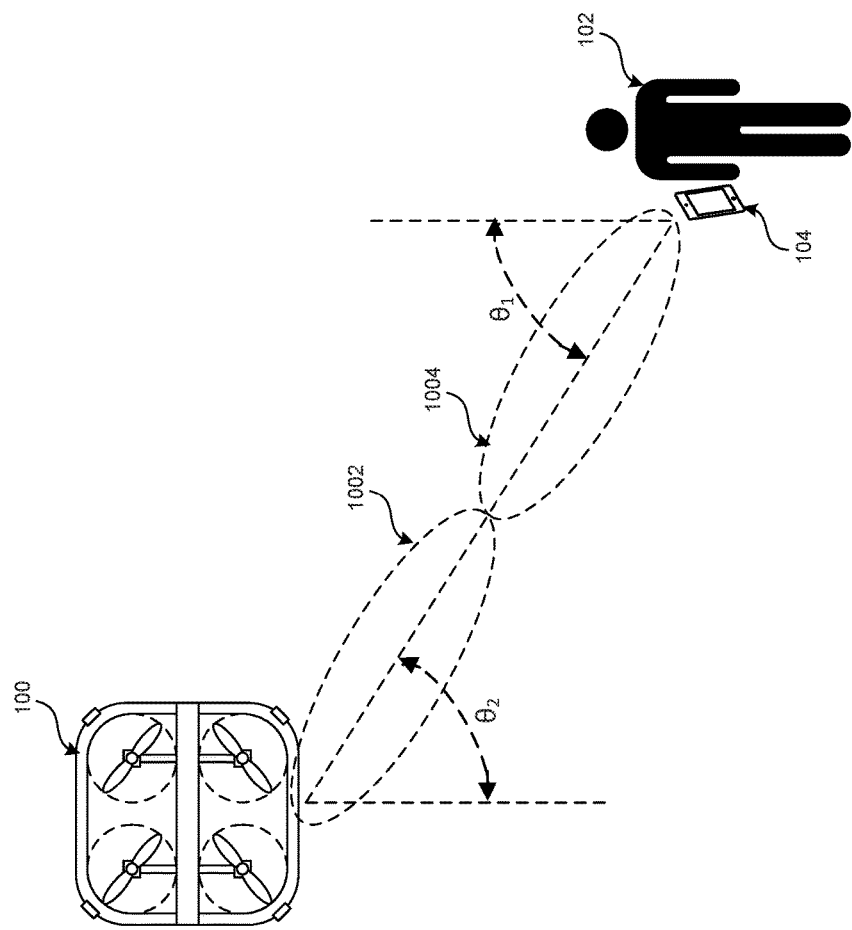
FIG. 10 shows a conceptual diagram of system for estimating the position and/or orientation of a UAV using a network of phased array wireless transceivers.

As illustrated in FIG. 10, a UAV 100 and/or PMD 104 may include a phased array of WiFi antenna and a relative position and/or pose may be calculated without the necessity for external existing Wi-Fi routers. According to some embodiments, the UAV 100 and/or PMD 104 may transmit and/or receive a beamformed RF signal via a phased antenna array. The UAV 100 and/or PMD 104 may then detect the phase differences and power levels of the respective incoming signals and calculate an AoA for the incoming signals. For example according to FIG. 10, the PMD 104 may determine an AoA of $\theta_1$ for the RF signals 1002 transmitted by the UAV 100. Similarly the UAV 100 may determine an AoA of $\theta_2$ for the RF signals 1004 transmitted by the PMD 104. This AoA information may then be incorporated with information gathered by an IMU on the UAV 100 and/or PMD 104 (as well as other positioning data as described earlier) in order to infer a relative position and/pose between the UAV 100 and the PMD 104.

Figure 11:
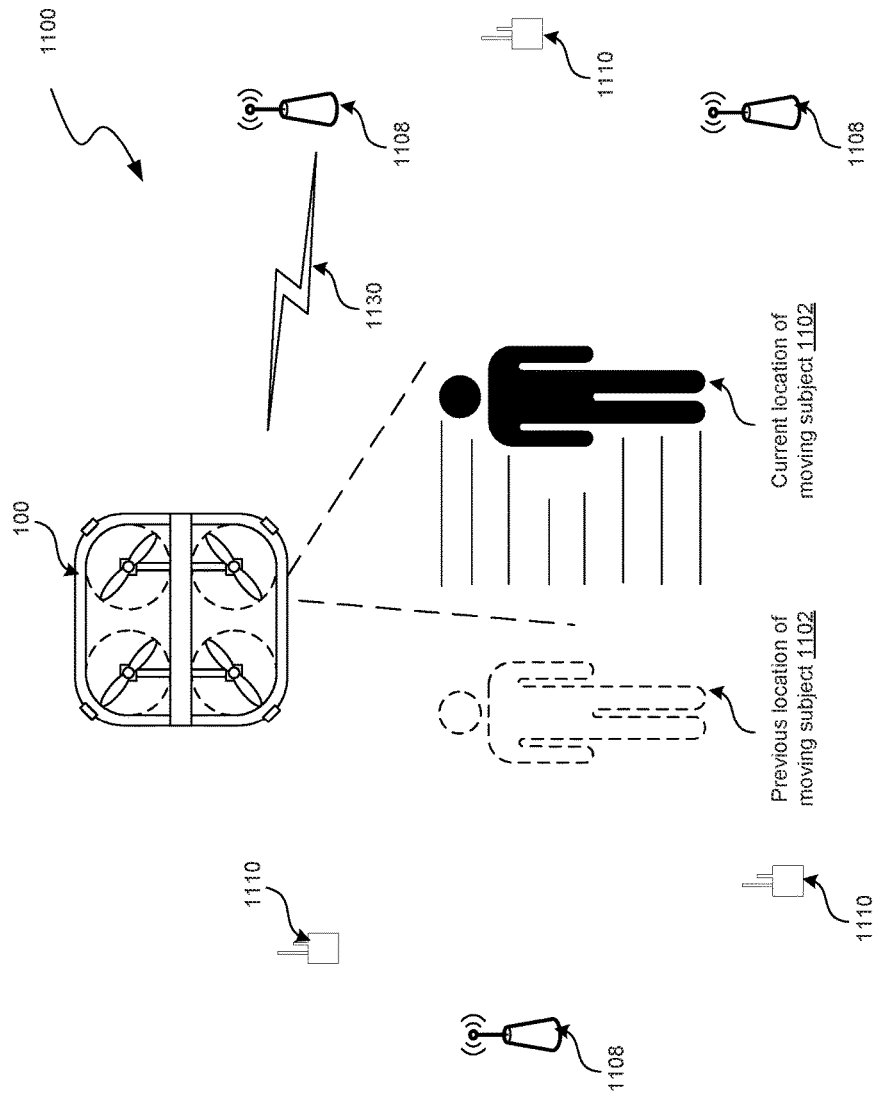
FIG. 11 shows a conceptual diagram of an example system for passive localization of an object tracked by a UAV.

According to some embodiments, an array of Wi-Fi transmitters and signal monitors may be utilized for device-free passive localization of objects that are not transmitting signals (e.g. a human subject not carrying a PMD). FIG. 11 illustrates an example system 1100 for device-free passive localization of an object (e.g. a human subject 1102). In this example a human subject 1102 passes through a network of Wi-Fi transmitters 1108 transmitting RF signals. The signal monitors 1110 (e.g. standard wireless sniffers) may detect changes in the characteristics of the RF signals received from the Wi-Fi transmitters 1108 caused by interference as the human subject 1102 passes through the signal field. Using localization algorithms, such changes in the RF signal field may be correlated to the presence of an object, its type, its orientation and its location. Also according to FIG. 4., information gathered by device-free passive localization system 1100 may be fed wirelessly (e.g. via Wi-Fi connection 1130) to a nearby UAV 100 in order to inform its tracking of the human subject 1102.

According to some embodiments an inertial measurement unit (IMU) may be used to determine relative position and/or orientation. An IMU is a device that calculates a vehicle's velocity, orientation and gravitational forces using a combination of accelerometers and gyroscopes. As described herein, an UAV 100 and/or PMD 104 may include one or more IMUs. Using a method commonly referred to as "dead reckoning" an IMU (or associated systems) may be used to calculate and track a predicted a current position based on a previously known position(s) using measured velocities and the time elapsed from the previously known position(s). While effective to an extent, the accuracy achieved through dead reckoning based on measurements from an IMU quickly degrades due to the cumulative effect of errors in each predicted current position. Errors are further compounded by the fact that each predicted position is based on an calculated integral of the measured velocity. To counter such effects, an embodiment utilizing localization using an IMU may include localization data from other sources (e.g. the GPS, Wi-Fi, and cellular systems described above) to continuously update the last known position and/or orientation of the object. Further, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Kalman filters are commonly applied in the area of aircraft navigation, guidance, and controls.

According to some embodiments, computer vision may be used to determine a relative position and/or orientation of a UAV 100 or any other object. The term, "computer vision" in this context may generally refer to the acquiring, processing, analyzing and understanding of captured images. Consider again the localization system 900 illustrated in FIG. 9. According to some embodiments, UAV 100 may include image capture devices and computer vision capabilities. In this example, UAV 100 may be programmed to track a subject (e.g. a human or some other object). Using computer vision, UAV 100 may recognize the subject in images captured by the image capture devices and may use the recognition information to perform aerial maneuvers to keep the subject in view, and/or may make adjustments in image capture (e.g. using a gimbaled image capture device) to keep the subject in view.

Relative position and/or orientation may be determined through computer vision using a number of methods. According to some embodiments an image capture device of the UAV 100 may include two or more cameras. By comparing the captured image from two or more vantage points, a system employing computer vision may calculate a distance to a captured physical object. With the calculated distance as well as other position and/or orientation data for the UAV (e.g. data from GPS, WiFi, Cellular, and/or IMU, as discussed above) a relative position and/or orientation may be determined between the UAV 100 and a point of reference (e.g. the captured physical object).

According to some embodiments, an image capture device of UAV 100 may be a single camera (i.e. a non-stereoscopic camera). Here, computer vision algorithms may identify the presence of an object and identify the object as belonging to a known type with particular dimensions. For example, through computer vision, the object may be identified as an adult male human. With this recognition data, as well as other position and/or orientation data for the UAV 100 (e.g. data from GPS, Wi-Fi, Cellular, and/or IMU, as discussed above), UAV 100 may predict a relative position and/or orientation of the object.

Figure 12B:
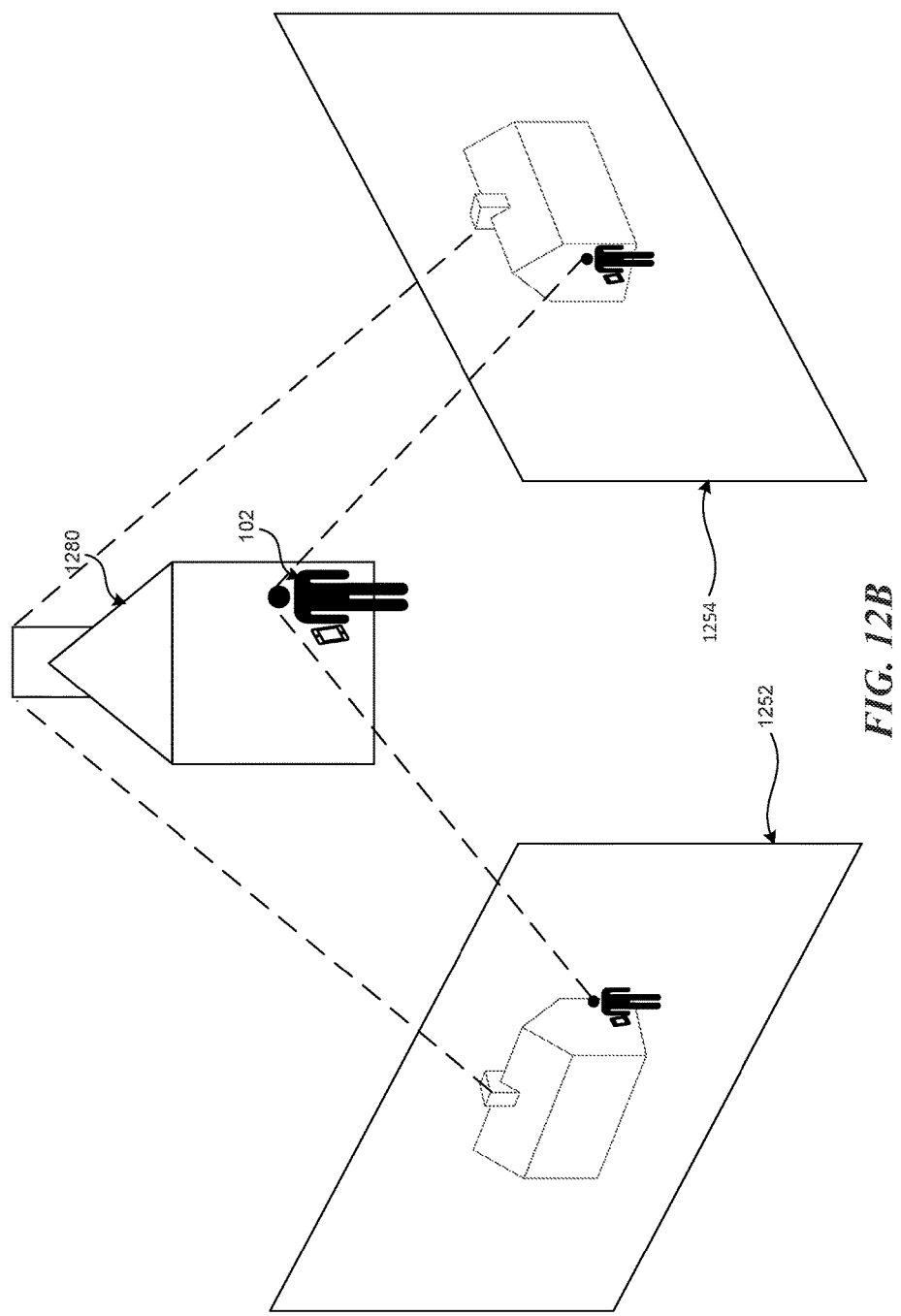

According to some embodiments, computer vision may be used along with measurements from an IMU (or accelerometer(s) or gyroscope(s)) within the UAV and/or PMD 104 carried by a user 102 as illustrated in FIG. 12A-12B. FIG. 12A shows a simple diagram that illustrates how sensor data gathered by an IMU at a PMD 104 may be applied to sensor data gathered by an image capture device at an UAV 100 to determine position and/or orientation data of a physical object (e.g. a user 102). Outline 1250 represents the 2-dimensional image captured field of view at UAV 100. As shown in FIG. 12A, the field of view 1250 includes the image of a physical object (here user 102) moving from one position to another. From its vantage point, UAV 100 may determine a distance A traveled across the image capture field of view 1250. The PMD 104, carried by user 102, may determine an actual distance B traveled by the user 102 based on measurements by internal sensors (e.g. the IMU) and an elapsed time. The UAV 100 may then receive the sensor data and/or the distance B calculation from PMD 104 (e.g., via wireless RF signal). Correlating the difference between the observed distance A and the received distance B, UAV 100 may determine a distance D between UAV 100 and the physical object (e.g user 102). With the calculated distance as well as other position and/or orientation data for the UAV 100 (e.g. data from GPS, WiFi, Cellular, and/or IMU, as discussed above) a relative position and/or orientation may be determined between the UAV 100 and the physical object (e.g. user 102).

Alternatively, estimations for the position and/or orientation of either the UAV 100 or PMD 104 may be made using a process generally referred to as "visual inertial odometry" or "visual odometry." FIG. 12B illustrates the working concept behind visual odometry at a high level. A plurality of images is captured in sequence as a camera moves through space. Due to the movement of the camera, the images captured of the surrounding space change from frame to frame. In FIG. 12B, this is illustrated by initial image capture field of view 1252 and a subsequent image capture field of view 1254 captured as the image capture device has moved from a first position and orientation to a second position and orientation over an elapsed time. In both images, the image capture device may capture real world physical objects, for example, the house 1280 and/or the human subject (e.g. user 102). Computer vision techniques are applied to the sequence of images to detect and match features of physical objects captured in the field of view of the camera. For example, in FIG. 12B, features such as the head of a human subject or the corner of the chimney on the house 1280 are identified, matched, and thereby tracked. By incorporating sensor data from an IMU (or accelerometer(s) or gyroscope(s)) associated with the camera to the tracked features of the image capture, estimations may be made for the position and/or orientation of the camera over time. This technique may be applied at both the UAV 100 and PMD 104 to calculate the position and/or orientation of both systems. Further, by communicating the estimates between the systems (e.g. via a Wi-Fi connection) estimates may be calculated for the respective positions and/or orientations relative to each other. As previously mentioned position, orientation, and motion estimation based in part on sensor data from an on board IMU may introduce error propagation issues. As previously stated, optimization techniques may be applied to position, orientation, and motion estimations to counter such uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data.

According to some embodiments, computer vision may include remote sensing technologies such as laser illuminated detection and ranging (LIDAR or Lidar). For example, an UAV 100 equipped with LIDAR may emit one or more laser beams in a continuous scan up to 360 degrees in all directions around the UAV 100. Light received by the UAV 100 as the laser beams reflect off physical objects in the surrounding physical world may be analyzed to construct a real time 3D computer model of the surrounding physical world. Such 3D models may be analyzed to identify particular physical objects (e.g. a user 102) in the physical world for tracking. Further, images captured by image capture device (e,g, as described earlier) may be combined with the laser constructed 3D models to form textured 3D models that may be further analyzed in real time or near real time for physical object recognition (e.g. by using computer vision algorithms).

The computer vision-aided localization and navigation system described above may calculate the position and/or orientation of features in the physical world in addition to the position and/or orientation of the UAV 100 and/or PMD 104. The position of these features may then be fed into the navigation system such that motion trajectories may be planned that avoid obstacles. In addition, in some embodiments, the visual navigation algorithms may incorporate data from proximity sensors (e.g. electromagnetic, acoustic, and/or optics based) to estimate obstacle position with more accuracy. Further refinement may be possible with the use of stereoscopic computer vision with multiple cameras, as described earlier.

According to some embodiments, the previously described relative position and/or orientation calculations may be performed by an UAV 100, PMD 104, remote computing device(s) (not shown in the figures), or any combination thereof.

The localization system 900 of FIG. 9 (including all of the associated subsystems as previously described) is only one example of a system for localization and navigation. Localization system 900 may have more or fewer components than shown, may combine two or more components, or a may have a different configuration or arrangement of the components. Some of the various components shown in FIGS. 9 through 12B may be implemented in hardware, software or a combination of both hardware and software, including one or more signal processing and/or application specific integrated circuits.

Unmanned Aerial Vehicle—System Components

An Unmanned Aerial Vehicle (UAV), sometimes referred to as a drone, is generally defined as any aircraft capable of controlled flight without a human pilot onboard. UAVs may be controlled autonomously by onboard computer processors and/or via remote control by a remotely located human pilot. Similar to an airplane, UAVs may utilize fixed aerodynamic surfaces along means for propulsion (e.g. propeller, rotor, jet. etc.) to achieve lift. Alternatively, similar to helicopters, UAVs may directly use the their means for propulsion (e.g. propeller, rotor, jet. etc.) to counter gravitational forces and achieve lift. Propulsion-driven lift (as in the case of helicopters) offers significant advantages in certain implementations, for example as a mobile filming platform, because it allows for controlled motion along all axes.

Multi-rotor helicopters, in particular quadcopters, have emerged as a popular UAV configuration. A quadcopter (also known as a quadrotor helicopter or quadrotor) is a multirotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, the a first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g. adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors but in a balanced fashion such that lift is increased on one side of the craft and decreased on the other side of the craft. An adjustment in altitude from hover may be induced by applying a balanced variation in all four rotors thereby increasing or decreasing the vertical thrust. Positional adjustments left, right, forward, and backward may be induced through combined pitch/roll maneuvers with balanced applied vertical thrust. For example to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will therefore accelerate the craft forward on horizontal plane.

Figure 13:
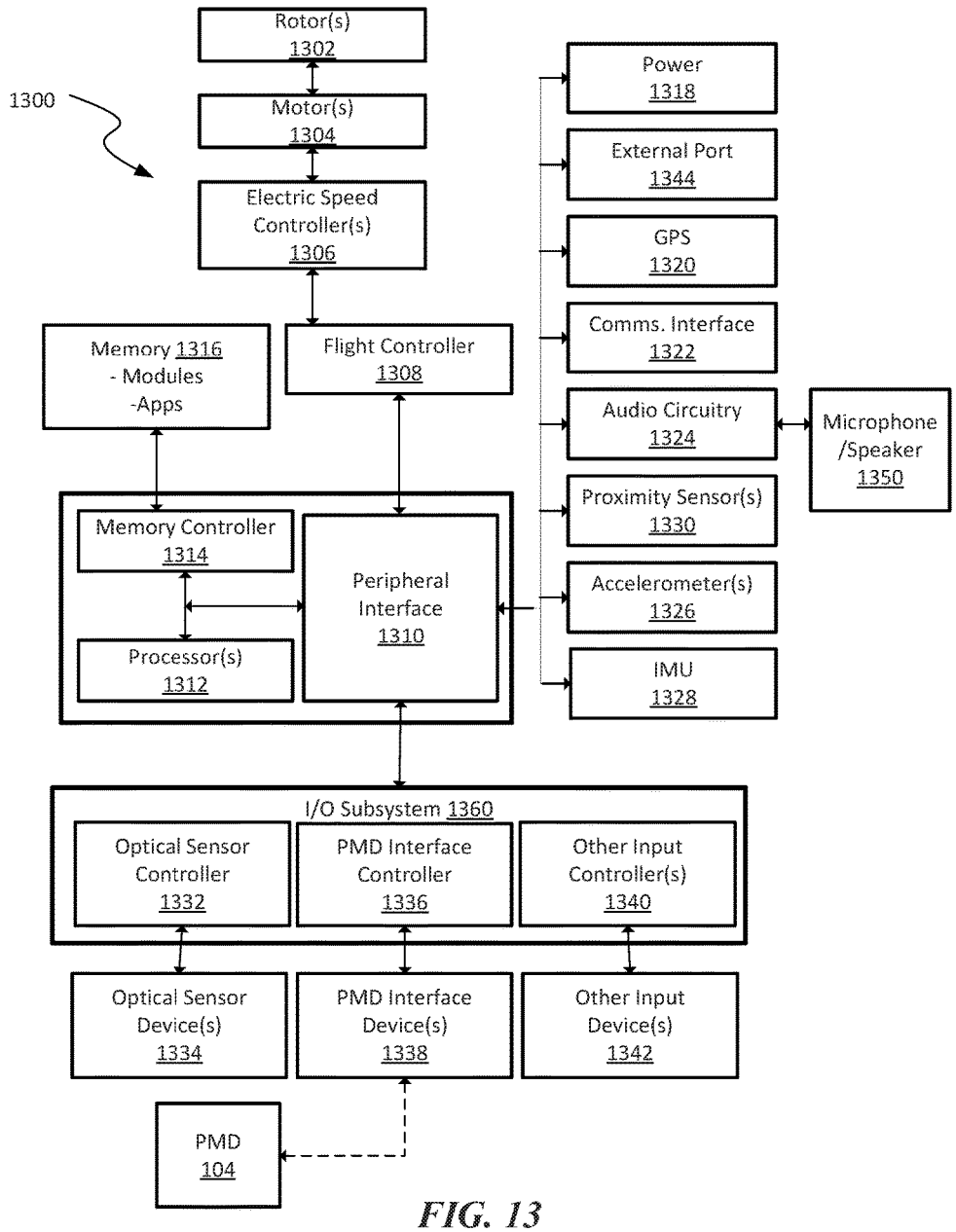
FIG. 13 shows a high level system diagram of components in an example UAV.

FIG. 13 is a high level diagram illustrating a system 1300 of components of example UAV 100, according to some embodiments. UAV system 1300 may include one or more means for propulsion (e.g. rotors 1302 and motor(s) 1304), one or more electronic speed controllers 1306, a flight controller 1308, a peripheral interface 1310, a processor(s) 1312, a memory controller 1314, a memory 1316 (which may include one or more computer readable storage mediums), a power module 1318, a GPS module 1320, a communications interface 1322, an audio circuitry 1324, an accelerometer 1326 (including subcomponents such as gyroscopes), an inertial measurement unit (IMU) 1328, a proximity sensor 1330, an optical sensor controller 1332 and associated optical sensor(s) 1334, a portable multifunction device (PMD) interface controller 1336 with associated interface device(s) 1338, and any other input controllers 1340 and input device 1342, for example display controllers with associated display device(s). General terms such as "sensors" may refer to one or more components or combinations of components, for example, microphone 1324, proximity sensors 1330, accelerometers 1326, an inertial measurement unit (IMU) 1328, optical sensors 1334, and any combination thereof. These components may communicate over one or more communication buses, interconnects, wires, or signal lines as represented by the arrows in FIG. 13.

UAV system 1300 is only one example of system for use in UAV 100. UAV system 1300 may have more or fewer components than shown, may combine two or more components as functional units, or a may have a different configuration or arrangement of the components. Some of the various components shown in FIG. 13 may be implemented in hardware, software or a combination of both hardware and software, including one or more signal processing and/or application specific integrated circuits.

As described earlier, the means for propulsion 1302-1304 may include a fixed-pitch rotor. The means for propulsion may also be a variable-pitch rotor (for example, using a gimbal mechanism), a variable-pitch jet engine, or any other mode of propulsion having the effect of providing force. The means for propulsion 1302-1304 may include a means for varying the applied thrust, for example via an electronic speed controller 1306 varying the speed of each fixed-pitch rotor. The means for propulsion 1302-1304 may include the previously described rotors 206a-b described with respect to FIGS. 2-6, and rotors 704a-e described with respect to FIGS. 7A-7E.

Flight Controller 1308 (sometimes referred to as a "flight control system" or "autopilot") may include a combination of hardware and/or software configured to receive input data (e.g. input control commands from PMD 104 or other sources), interpret the data and output control signals to the propulsion systems 1302-1306 and/or aerodynamic surfaces (e.g. fixed wing control surfaces) of the UAV 100.

Memory 1316 may include high-speed random access memory and may also include non-volatile memory, such as one or more magnetic disk storage devices, flash memory devices, or other non-volatile solid-state memory devices. Access to memory 1316 by other components of UAV system 1300, such as the processors 1312 and the peripherals interface 1310, may be controlled by the memory controller 1314.

The peripherals interface 1310 may couple the input and output peripherals of the UAV 100 to the processor(s) 1312 and memory 1316. The one or more processors 1312 run or execute various software programs and/or sets of instructions stored in memory 1316 to perform various functions for the UAV 100 and to process data. In some embodiments, processors 1312 may include general central processing units (CPUs), specialized processing units such as Graphical Processing Units (GPUs) particularly suited to parallel processing applications, or any combination thereof.

In some embodiments, the peripherals interface 1310, the processor(s) 1312, and the memory controller 1314 may be implemented on a single integrated chip. In some other embodiments, they may be implemented on separate chips.

The network communications interface 1322 may facilitate transmission and reception of communications signals often in the form of electromagnetic signals. The transmission and reception of electromagnetic communications signals may be carried out over physical media such copper wire cabling or fiber optic cabling, or may be carried out wirelessly for example, via a radiofrequency (RF) transceiver. In some embodiments the network communications interface may include RF circuitry. In such embodiments RF circuitry may convert electrical signals to/from electromagnetic signals and communicate with communications networks and other communications devices via the electromagnetic signals. The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g. via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11ac), voice over Internet Protocol (VoIP), Wi-MAX, or any other suitable communication protocol, including communication protocols not yet developed as of the filing date of this document.

The audio circuitry 1324, including the speaker and microphone 1350 may provide an audio interface between the surrounding environment and the UAV 100. The audio circuitry 1324 may receive audio data from the peripherals interface 1310, convert the audio data to an electrical signal, and transmits the electrical signal to the speaker 1350. The speaker 1350 may convert the electrical signal to human-audible sound waves. The audio circuitry 1324 may also receive electrical signals converted by the microphone 1350 from sound waves. The audio circuitry 1324 may convert the electrical signal to audio data and transmits the audio data to the peripherals interface 1310 for processing. Audio data may be retrieved from and/or transmitted to memory 1316 and/or the network communications interface 1322 by the peripherals interface 1310.

The I/O subsystem 1360 may couple input/output peripherals on the UAV 100, such as an optical sensor system 1334, the PMD interface device 1338, and other input/control devices 1342, to the peripherals interface 1310. The I/O subsystem 1360 may include an optical sensor controller 1332, a PMD interface controller 1336, and other input controller(s) 1340 for other input or control devices. The one or more input controllers 1340 receive/send electrical signals from/to other input or control devices 1342.

The other input/control devices 1342 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the UAV system 1300 and a user. A display controller may receive and/or send electrical signals from/to the touch screen. The touch screen may display visual output to the user. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 1316) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

The PMD interface device 1338 along with PMD interface controller 1336 may facilitate the transmission of data between the UAV system 1300 and a PMD 104. According to some embodiments, communications interface 1322 may facilitate the transmission of data between UAV 100 and a PMD 104 (for example where data is transferred over a local Wi-Fi network).

The UAV system 1300 also includes a power system 1318 for powering the various components. The power system 1318 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in computerized device.

The UAV system 1300 may also include one or more optical sensors 1334. FIG. 13 shows an optical sensor coupled to an optical sensor controller 1332 in I/O subsystem 1360. The optical sensor 1334 may include a chargecoupled device (CCD) or complementary metal-oxide semiconductor (CMOS) phototransistors. The optical sensor 1334 receives light from the environment, projected through one or more lens (the combination of optical sensor and lens herein referred to as a "camera") and converts the light to data representing an image. In conjunction with an imaging module located in memory 1316, the optical sensor 1332 may capture still images and/or video. Optical sensors 1334 may be understood as the same or similar as image capture devices 210 and 212 described with respect to FIGS. 2-7E and gimbaled image capture device 810 described with respect to FIGS. 8A and 8B.

The UAV system 1300 may also include one or more proximity sensors 1330. FIG. 13 shows a proximity sensor 1330 coupled to the peripherals interface 1310. Alternately, the proximity sensor 1330 may be coupled to an input controller 1340 in the I/O subsystem 1360. Proximity sensors 1330 may generally include remote sensing technology for proximity detection, range measurement, target identification, etc. For example, proximity sensors 1330 may include radar, sonar, and light illuminated detection and ranging (Lidar).

The UAV system 1300 may also include one or more accelerometers 1326. FIG. 13 shows an accelerometer 1326 coupled to the peripherals interface 1310. Alternately, the accelerometer 1326 may be coupled to an input controller 1340 in the I/O subsystem 1360.

The UAV system 1300 may include one or more inertial measurement units (IMU) 1328. An IMU 1328 may measure and report the UAV's velocity, acceleration, orientation, and gravitational forces using a combination of gyroscopes and accelerometers (e.g. accelerometer 1326).

The UAV system 1300 may include a global positioning system (GPS) receiver 1320. FIG. 13 shows an GPS receiver 1320 coupled to the peripherals interface 1310. Alternately, the GPS receiver 1320 may be coupled to an input controller 1340 in the I/O subsystem 1360. The GPS receiver 1320 may receive signals from GPS satellites in orbit around the earth, calculate a distance to each of the GPS satellites (through the use of GPS software), and thereby pinpoint a current global position of UAV 100. In some embodiments, positioning of UAV 100 may be accomplished without GPS satellites through the use of other techniques as described herein.

In some embodiments, the software components stored in memory 1316 may include an operating system, a communication module (or set of instructions), a flight control module (or set of instructions), a localization module (or set of instructions), a computer vision module, a graphics module (or set of instructions), and other applications (or sets of instructions). For clarity one or more modules and/or applications may not be shown in FIG. 13.

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

A communications module may facilitate communication with other devices over one or more external ports 1344 and may also include various software components for handling data transmission via the network communications interface 1322. The external port 1344 (e.g., Universal Serial Bus (USB), FIREWIRE, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including without limitation text, still images, videos, animations, icons (such as user-interface objects including soft keys), and the like. The graphics module in conjunction with a graphics processing unit (GPU) 1312 may process in real time or near real time, graphics data captured by optical sensor(s) 1334 and/or proximity sensors 1330.

A computer vision module, which may be a component of graphics module, provides analysis and recognition of graphics data. For example, while UAV 100 is in flight, the computer vision module along with graphics module (if separate), GPU 1312, and optical sensor(s) 1334 and/or proximity sensors 1330 may recognize and track the captured image of a subject located on the ground. The computer vision module may further communicate with a localization/navigation module and flight control module to update a relative position between UAV 100 and a point of reference, for example a target object (e.g. a PMD or human subject), and provide course corrections to maintain a constant relative position where the subject is in motion.

A localization/navigation module may determine the location and/or orientation of UAV 100 and provides this information for use in various modules and applications (e.g., to a flight control module in order to generate commands for use by the flight controller 1308).

Optical sensor(s) 1334 in conjunction with, optical sensor controller 1332, and a graphics module, may be used to capture still images or video (including a video stream) and store them into memory 1316.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 1316 may store a subset of the modules and data structures identified above. Furthermore, memory 1316 may store additional modules and data structures not described above

What is claimed is:

1. An unmanned aerial vehicle (UAV) comprising:
    a central body including a plurality of walls forming an interior body space, the plurality of walls including:
        a first side wall opposite a second side wall;
        a first end wall opposite a second end wall; and
        a top wall opposite a bottom wall;
    a flight controller arranged within the interior body space;
    an inertial measurement unit (IMU) communicatively coupled to the flight controller;
    a first plurality of powered rotors structurally coupled to the central body of the UAV by a first plurality of arms extending from the first side wall, the first plurality of powered rotors communicatively coupled to the flight controller to receive control commands;
    a second plurality of powered rotors structurally coupled to central body of the UAV by a second plurality of arms extending from the second side wall, the second plurality of powered rotors communicatively coupled to the flight controller to receive control commands;
    a first perimeter structure extending from the first sidewall of the central body and surrounding at least a portion of an outer edge of the first plurality of powered rotors;

a second perimeter structure extending from the second sidewall of the central body and surrounding at least a portion of an outer edge of the second plurality of powered rotors;

wherein the first and second powered rotors are generally aligned along a horizontal plane relative to the central body;

wherein the first and second perimeter structures have hollow cross sections having walls surrounding an interior perimeter space;

a plurality of image capture devices embedded in the walls of the first and second perimeter structures and communicatively coupled to the flight controller via wires within the interior perimeter space, each of the plurality of image capture devices oriented in a different one of a plurality of directions relative to the central body so as to capture unobstructed images in the plurality of directions around the UAV, while in use;

wherein the flight controller is configured to:
receive images captured by the plurality of image capture devices;
receive sensor data gathered by the IMU;
calculate a predicted position and/or orientation of the UAV based on the received images and sensor data; and
generated control commands based on the calculated position and/or orientation of the UAV, the control commands configured to cause the first and second powered rotors to autonomously maneuver the UAV.

2. The UAV of claim 1, further comprising:
a gimbaled image capture device structurally coupled to the first end wall of the central body by a hybrid digital-mechanical gimbal, the gimbaled image capture device configured for tracking and filming a subject in a physical environment surrounding the UAV, while in use.

3. The UAV of claim 1, further comprising:
a top image capture device embedded in the top wall of the central body and communicatively coupled to the flight controller, the top image capture device arranged generally perpendicular to the horizontal plane so as to capture images from above the UAV, while in use; and
a bottom image capture device embedded in the bottom wall of the central body and arranged generally perpendicular to the horizontal plane so as to capture images from below the UAV, while in use.

4. The UAV of claim 1, further comprising a wireless communications interface configured for communication with a mobile user device.

5. An unmanned aerial vehicle (UAV) comprising:
a central body including a plurality of walls forming an interior body space, the plurality of walls including a first side wall opposite a second side wall;
a plurality of powered rotors configured to provide propulsion for the UAV while in use, the plurality of powered rotors including:
a first powered rotor coupled to a first arm extending away from the first side wall;
a second powered rotor coupled a second arm extending away from the second side wall;
a perimeter structure coupled to the central body, the perimeter structure including;
a first perimeter structure component extending from the first sidewall of the central body and surrounding at least a portion of an outer edge of the first powered rotor; and a second perimeter structure component extending from the second sidewall of the central body and surrounding at least a portion of an outer edge of the second powered rotor;
wherein the first and second perimeter structures have hollow cross sections having walls surrounding an interior perimeter space; and
a plurality of image capture devices coupled to the perimeter structure, each of the plurality of image capture devices oriented in a different one of a plurality of directions relative to the central body so as to capture unobstructed images in the plurality of directions around the UAV, while in use;
wherein the UAV is configured to navigate autonomously, while in use, using images received via the plurality of image capture devices.

6. The UAV of claim 5, wherein the plurality of powered rotors and the perimeter structure are aligned substantially in parallel with a horizontal plane relative to the central body.

7. The UAV of claim 5, wherein the perimeter structure is configured to protect the plurality of powered rotors from contact with other objects, while in use.

8. The UAV of claim 5, wherein the plurality of image capture devices are arranged along the perimeter structure so as capture unobstructed stereoscopic images in the plurality of directions around the UAV, while in use.

9. The UAV of claim 5, wherein the each of the plurality of image capture devices comprises a stereoscopic camera, the stereoscopic camera including two optical sensors.

10. The UAV of claim 5, wherein the perimeter structure forms a substantially rectangular perimeter around the UAV, the substantially rectangular perimeter including four opposing corners, and wherein plurality of image capture devices include at least four image capture devices, each of the at least four image capture devices embedded in the wall of the perimeter structure at a different one of the four opposing corners.

11. The UAV of claim 5, wherein the plurality of image capture devices are communicatively coupled to a flight controller of the UAV via wires arranged within the interior space of the perimeter structure.

12. The UAV of claim 11, wherein the flight controller is arranged within the central body of the UAV.

13. The UAV of claim 5, further comprising one or more additional sensors arranged within the interior space of the perimeter structure, the one or more additional sensors including one or more of:
an inertial measurement unit (IMU);
an accelerometer;
a gyroscope; or
a proximity sensor.

14. The UAV of claim 5, wherein the UAV is configured to navigate autonomously using a process of visual inertial odometry.

15. The UAV of claim 5, wherein the perimeter structure is made of a carbon fiber material.

16. The UAV of claim 5, further comprising a wireless communications interface configured for communication with a mobile user device.

17. The UAV of claim 5,
wherein the central body includes a first end and a second end opposite the first end;
wherein the first perimeter structure component extends from a first connection point on the first side wall to a second connection point on the first side wall, the first connection point proximate to the first end of the central body and the second connection point proximate to the second end of the central body; and wherein the second perimeter structure component extends from a third connection point on the second side wall to a fourth connection point on the second side wall, the third connection point proximate to the first end of the central body and the fourth connection point proximate to the second end of the central body.

18. The UAV of claim 17, wherein the first arm extends from the first side wall of the central body at a position substantially between the first connection point and the second connection point and wherein the second arm extends from the second side wall at a position substantially between the third connection point and the fourth connection point.

19. The UAV of claim 5, further comprising:

a second plurality of image capture devices structurally coupled to the central body of the UAV and arranged substantially perpendicular to a horizontal plane of the central body so as to capture images above and/or below the UAV, while in use.

20. The UAV of claim of claim 5, wherein the central body includes a first end and a second end opposite the first end, the first end and second end adjacent to the first and second side walls, the UAV further comprising:

a gimbaled image capture device structurally coupled to the first end of the central body of the UAV by a mechanical gimbal, the gimbaled image capture device configured for tracking and filming a subject in a physical environment surrounding the UAV, while in use.

21. The UAV of claim 20, wherein the mechanical gimbal is part of a hybrid digital-mechanical gimbal system, the hybrid digital mechanical gimbal system configured to mechanically actuate the gimbaled image capture device about a first access and digitally process images captured by the gimbaled image capture device to provide the effect of actuating the gimbaled image capture device about a second axis.

22. The UAV of claim 20, wherein images captured via the gimbaled image capture device are transmitted from the UAV, via a wireless communication interface, for presentation via a display of a mobile user device.

23. The UAV of claim of claim 5, further comprising a protective grating arranged above and below the powered rotors, the protective grating covering at least a portion of a top opening defined by a top edge of the perimeter structure and a bottom opening defined by a bottom edge of the perimeter structure.

* * * * *